United States Patent [19]
Eppstein et al.

[11] Patent Number: 6,067,340
[45] Date of Patent: May 23, 2000

[54] THREE-DIMENSIONAL STOCHASTIC TOMOGRAPHY WITH UPSCALING

[76] Inventors: Margaret J. Eppstein, 22 Sunset Ct., Hinesburg, Vt. 05461; David E. Dougherty, 151 Robinson Pkwy., Burlington, Vt. 05401

[21] Appl. No.: 09/110,506

[22] Filed: Jul. 6, 1998

Related U.S. Application Data

[60] Provisional application No. 60/051,986, Jul. 9, 1997.

[51] Int. Cl.$^7$ .................................................. G01N 23/04
[52] U.S. Cl. ............................................... 378/4; 378/901
[58] Field of Search ............................. 378/4, 8, 15, 21, 378/901

[56] References Cited

U.S. PATENT DOCUMENTS

| | | | |
|---|---|---|---|
| 3,778,614 | 12/1973 | Hounsfield | 378/11 |
| 4,511,219 | 4/1985 | Giles et al. | 349/17 |
| 4,751,643 | 6/1988 | Lorensen et al. | 382/132 |
| 4,783,744 | 11/1988 | Yueh | 701/221 |
| 5,068,788 | 11/1991 | Goodenough et al. | 382/131 |

OTHER PUBLICATIONS

"3–D Maximum a Posteriori Estimation for Single Photon Emission Computed Tomography on Massively–parallel Computers," by Miller, et. al., *IEEE trans. on Med. Imaging*, 12(3):560–565, 1993.

"Three–Dimensional Massively Parallel Electromagnetic Inversion—Ii. Analysis of a Crosswell Electromagnetic Experiment," by Alumbaugh, et. al., *Geophys. J. Int.*, 128:355–363, 1997.

*Applied Optimal Estimation*, by Gelb, et al., The M.I.T. Press, Cambridge, MA., 1974.

*Algorithms for Clustering Data*, by Jain, et al., Prentice–Hall, Englewood Cliffs, N.J., 1988.

*Random Fields: Analysis and Synthesis*, by Erik Vanmarcke, The M.I.T. Press, Cambridge, MA, 1983.

"Computerized Geophysical Tomography," by Dines, et al. *Proc. of the IEEE*, 67(7):1065–1073, 1979.

"Traveltime Inversion for the Geometry of Aquifer Lithologies," *Geophysics*, 61(6):1728–1737, 1996.

"An Interative Stochastic Inverse Method: Conditional Effective Transmissivity and Hydraulic Head Fields," by Yeh, et al. *Water Resources Research*, 32(1):85–92, 1996.

"Mapping Hydraulic Conductivity: Sequential Conditioning with Measurements of Solute Arrival Time, Hydraulic Head, and Local Conductivity," by Harvey, et. al., *Water Resources Research*, 31(7):1615–1626, 1995.

"Simultaneous Estimation of Transmissivity Values and Zonation," by Eppstein, et al., *Water Resources Research*, 32(11):3321–3336, 1996.

"Optimal 3–D Traveltime Tomography," by Eppstein, et al., *Geophysics* 63(3): 1053–106, 1998.

"Efficient 3–d Data Inversion: Soil Characterization and Moisture Monitoring from Crosswell Gpr at a Vermont Test Site," by Eppstein, et al., *Water Resources Research* 34(8):1889–1900, 1998.

*Primary Examiner*—David V. Bruce
*Attorney, Agent, or Firm*—Downs Rachlin & Martin PLLC

[57] ABSTRACT

Apparatus and methods for estimating the internal structure of a physical domain (16), such as a volume of earth or of a human body, based on tomographic signals (18) having passed there through. Measurements of signals are inverted using an approximate extended Kalman filter to condition estimates of first and second spatial moments of stochastic random variables representing discrete estimates of one or more parameters describing the domain's internal structure. Measurement conditioning is alternated with upscaling in order to reduce the number of random variables used and also for the purpose of determining the geometry of the spatial regions of the domain represented by each of the random variables. Upscaling includes the use of cluster analysis for identification of random variables to merge, followed by random variable merging using random field union. Upscaling improves computational properties of the invention and can be used to identify discrete structural features in the domain. Various domain decomposition strategies can be employed to make the invention computationally feasible on even very large domains.

60 Claims, 16 Drawing Sheets

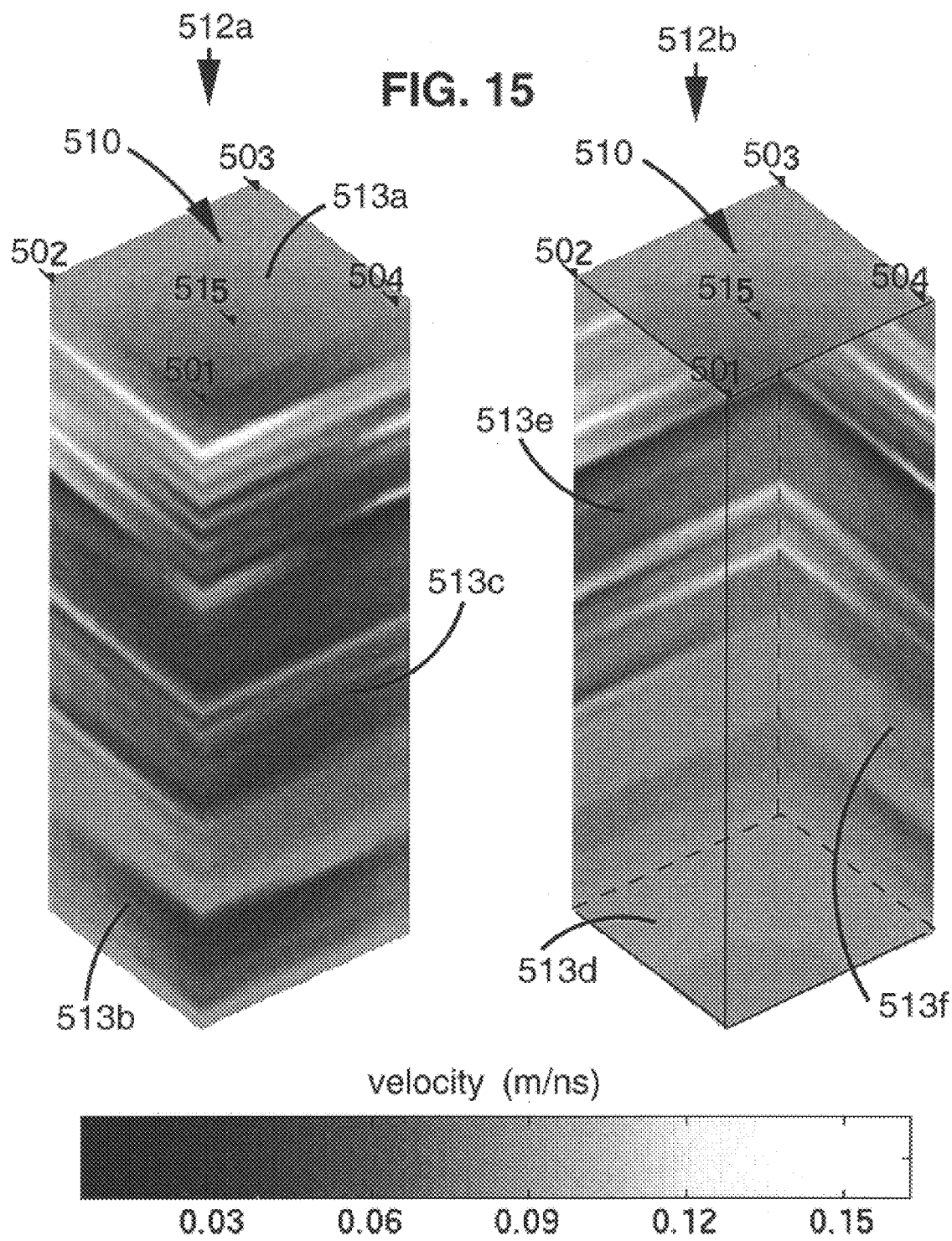

THREE-DIMENSIONAL STOCHASTIC TOMOGRAPHY WITH UPSCALING

This application claims the benefit of U.S. provisional Ser. No. 60/051,986 filed Jul. 9, 1997.

The invention was made with Government support under grants ASC-91000226, MSS-9214698 and OSR-9350540 awarded by the National Science Foundation. The Government has certain rights in this invention.

FIELD OF THE INVENTION

This invention relates to the fields of tomography and structure identification and, in particular, to three-dimensional tomography for geophysical imaging, biomedical imaging, materials imaging, and the like.

BACKGROUND OF THE INVENTION

The field of tomography involves obtaining a set of signal measurements (such as X-ray attenuation or traveltimes of acoustic or electromagnetic waves) that traverse a physical domain and then employing an inverse method to estimate spatially distributed material parameters (such as absorption or propagation velocity). The results are maps of spatially distributed estimates of the material properies, which are typically displayed in graphical format. Tomographic methods were first developed for biomedical imaging applications, such as disclosed in U.S. Pat. No. 3,778,614 to Hounsfield. These methods were subsequently adapted for geophysical applications using cross-borehole measurements as described in the article by Dines et al., entitled "Computerized Geophysical Tomography," *Proc. of the IEEE*, 67(7):1065–1073, 1979.

Although there have been many improvements in tomographic methods since they were first introduced, shortcomings remain. In particular, there remains a need for accurate and computationally efficient algorithms to invert possibly sparse three-dimensional signals, as well as a means for assessing the spatially-varying accuracy of the inversion. While many so-called three-dimensional tomographic methods exist, the vast majority of these methods actually invert the data in two-dimensional planes, and then construct the three-dimensional image from these two-dimensional slices. In the publication by Miller et al., entitled "3-D maximum a posteriori estimation for single photon emission computed tomography on massively-parallel computers," IEEE *trans. on Med. Imaging,* 12(3):560–565, 1993, it is shown that full three-dimensional single photon emission inversion is significantly more accurate than stacked two-dimensional inversions. However, the resulting method is so computationally intensive that it requires a massively parallel implementation. The method described therein employs an iteratively applied back projection method, which requires dense measurements. Similarly, in the publication by Alumbaugh et al., entitled "Three-dimensional massively parallel electromagnetic inversion—II. Analysis of a crosswell electromagnetic experiment," *Geophys. J. Int.,* 128:355–363, 1997, a massively parallel full three-dimensional geophysical electromagnetic inversion using the iterative conjugate gradient method is disclosed.

There are trade-offs inherent in specifying the degree of spatial discretization in tomography. Very finely discretized models require more computational resources and are typically implemented using relatively simple iterative update mechanisms which may require additional arbitrary interpolation, smoothing, and regularization. Furthermore, unless data density and quality are similarly high, fine discretization can lead to instabilities in the inversion. On the other hand, coarsely discretized models, which are more computationally efficient and stable, may not provide adequate resolution of the heterogeneity present and detectable in the signal, and errors in the geometry of the parameterization may lead to errors in the estimation.

Unlike typical tomographic methods, which estimate model parameter values only, stochastic inversion methods model discretized parameters with stochastic random variables, in which each discrete parameter is modeled by its mean value, its variance, and its covariance with all other parameters in the domain model. Perhaps the most statistically sophisticated stochastic inversion algorithm is the extended Kalman filter, which has been widely and successfully applied to problems in control systems engineering. See, e.g., Gelb, A. (Ed.), *Applied Optimal Estimation*, The M.I.T. Press, Cambridge, Mass., 1974. This Bayesian filter uses prior estimates of the model values and error covariance of the parameters and the states, and the state-parameter cross covariance. The filter updates the model values and covariance in accordance with measurements so as to minimize the estimation error variance of the estimated values, by explicitly estimating the spatially-varying measurement error covariance and system noise covariance of the forward simulator. The updates are optimal for the linearized system. A pseudo-code description of the extended Kalman filter is shown below.

Time Update:
x=Φx+f (i.e., predict states x from parameters y using a computer programmed forward simulator)

$$J = \frac{\delta x}{\delta y}$$

$P^{xy}=JP^{y}+\Phi P^{xy}$ $Px=JP^{y}J^{T}+Q+\Phi P^{x}\Phi^{T}+J(P^{xy})^{T}\Phi^{T}+\Phi P^{xy}J^{T}$

Measurement Update:

$K^{x}=P^{x}H^{T}(R+HP^{x}H^{T})^{-1}$ $K^{y}=(P^{xy})^{T}H^{T}(R+HP^{x}H^{T})^{-1}$ $x=x+K^{x}(z-Hx)$ $y=y+K^{y}(z-Hx)$ $P^{x}=P^{x}-K^{x}HP^{x}$ $P^{y}=P^{y}-K^{y}HP^{xy}$ $P^{xy}=P^{xy}-K^{x}HP^{xy}$ wherein
= denotes variable assignment in a computer program;
Φ is the transition matrix (a function of y) for predicting x;
x is a vector of state variables
y is a vector of parameter variables;
J is the Jacobian sensitivity matrix;
f is a vector of forcing conditions;
$P^{x}$ is the state covariance matrix;
$P^{y}$ is the parameter covariance matrix;
$P^{xy}$ is the state-parameter cross-covariance matrix;
Q is the covariance of the system noise of the simulator;
R is the covariance of the measurement error;
H is the observation matrix;
z is a vector of measurements;
$K^{x}$ is the state gain matrix;

$K^y$ is the parameter gain matrix;
superscript T denotes matrix transpose; and
superscript −1 denotes matrix inversion.

The covariance matrices provide implicit smoothing, interpolation, and regularization. One or more measurement updates may be performed during a given timestep. The recursive updates of the parameter and state values and covariances enable sequential incorporation of time-series data measurements, as well as sequential assimilation of subsets of batches of stationary measurements (to limit the size of the matrix inversions required) and/or iteration upon the same data to help reduce errors due to non-linearities. The resulting covariance estimates provide a means of assessing the accuracy of the parameter estimates. The computational complexity of the extended Kalman filter has limited its application to the estimation of relatively few parameters, and it is believed this method has not previously been used in tomography.

Iterative co-kriging is described in the publication by Yeh et al. entitled "An iterative stochastic inverse method: Conditional effective transmissivity and hydraulic head fields", *Water Resources Research*, 32(1):85–92, 1996. Iterative co-kriging is similar to, but less general than, the extended Kalman filter. In iterative co-kriging, measurement error and system noise are not explicitly modeled. Instead, a regularization term is added, and parameter (but not state) values and covariance can be conditioned on the measurements. Sequential co-kriging, as described in the publication by Harvey et al., entitled "Mapping hydraulic conductivity: Sequential conditioning with measurements of solute arrival time, hydraulic head, and local conductivity," *Water Resources Research*, 31(7):1615–1626, 1995, is similar to iterative co-kriging, but designed to be used to sequentially incorporate distinct forms of data. Co-kriging methods have been applied extensively to the two-dimensional groundwater inverse problem, but not to very large problems as are typical in three-dimensional tomography.

Cluster analysis is the formal study of algorithms and methods for grouping, or classifying, objects (see Jain et al., *Algorithms for Clustering Data*, Prentice-Hall, Englewood Cliffs, N.J., 1988). In the well-known k-means clustering algorithm, data are organized into one of k clusters, each data element being placed in the cluster whose cluster centroid (i.e., the mean of all data elements in the cluster) is closest to the value of the element. The number of clusters can be predetermined or can be based on the characteristics of the data itself. For example, divisive, partitional clustering algorithms cluster the data into as few clusters as possible, such that the data elements within each cluster are more similar to each other than to data elements in other clusters. Clusters are added in as necessary to satisfy a particular clustering criterion. Several imaging methods, such as that disclosed in U.S. Pat. No. 4,751,643 to Lorensen et al., have been devised using cluster analysis methods to post-process three-dimensional reconstructed tomographic images to identify distinct (e.g., anatomical) structures of a larger scale than the spatial discretization of the imaged parameter. The article by Hyndman et al., entitled "Traveltime inversion for the geometry of aquifer lithologies," *Geophysics*, 61(6):1728–1737, 1996, discloses a method wherein two-dimensional cross-borehole traveltime tomography is alternated with cluster analysis in an iterative fashion to determine aquifer lithology. The method involves constraining the assignment of pixel-based parameter values to one of a small number of populations based on the histogram of slowness residuals, thereby increasing stability and convergence properties (but also the computational complexity) of the algorithm. Two-dimensional images are subsequently interpolated into three dimensions. In these non-stochastic methods, parameter covariances are not modeled. Therefore, when parameters within clusters are merged, there is no need to merge their covariances. These structure determination methods do not employ clustering as a means for estimating the parameterization for subsequent estimation. Therefore, the cluster analysis increases, rather than decreases, the computational burden of these imaging technologies.

Statistically homogeneous two-dimensional random fields can be merged together using a technique known as random field averaging. See, e.g., Vanmarcke, E. *Random Fields. Analysis and Synthesis*, The M.I.T. Press, Cambridge, Mass., 1983. The variance of the averaged field is always less than or equal to the area-weighted average of the variance of the component fields, even when the estimates of the means of the component fields are different. If the true means of the component fields are different (i.e., they are statistically heterogeneous), then random field averaging will underestimate the true variance of the merged field. This method is therefore of limited usefulness for "upscaling" heterogeneous domains modeled by heterogeneous stochastic random variables.

SUMMARY OF THE INVENTION

The present invention relates to tomography and non-invasive structure identification, and more particularly, to apparatus and methods for estimating the internal structure of a physical domain based on signals having passed there through (i.e., tomographic measurements). The method is general, and it will be apparent to one skilled in the art that the present invention is applicable to a wide variety of fields where it is useful to non-invasively (or minimally invasively) deduce the internal structure of a domain, including geophysical imaging, biomedical imaging, materials imaging, and the like.

A first aspect of the invention is a method of estimating a domain's internal structure from tomographic measurements using an approximate extended Kalman filter. A set of three-dimensional random variables represents one or more parameters describing the domain's internal structure. Prior estimates of first and second spatial moments are conditioned on tomographic measurements using the approximate extended Kalman filter. This filter, disclosed herein, is a computationally efficient approximation to the extended Kalman filter.

A further aspect of the invention is a method of estimating a domain's internal structure from tomographic measurements by alternating measurement conditioning with upscaling. Upscaling consists of partitioning the random variables used to model the domain into non-intersecting subsets, and then merging the random variables within each subset into a new random variable. Upscaling thus provides a means for reducing the number of random variables used to model the domain, thereby increasing the computational efficiency, stability, and sensitivity of the measurement conditioning process. Upscaling also provides a means for detecting structural features that are on a larger scale than the scale of the initial discretization. A preferred embodiment of the invention implements the measurement conditioning with the approximate extended Kalman filter, uses cluster analysis to determine how to partition the random variables into subsets, and uses random field union to merge the random variables within each subset. Random field union is a method, disclosed herein, for merging first and second moments of statistically heterogeneous random variables.

When cluster analysis and random field union are used to embody the upscaling, the resulting random variable discretization is reflective of structural features of the domain, both in terms of the number of random variables used and the geometry of the spatial region of the domain that is represented by each random variable.

A further aspect of the invention is a method for estimating a domain's internal structure from tomographic measurements by alternating measurement conditioning with upscaling and further using domain decomposition. The set of random variables representing a large domain is partitioned into non-overlapping subsets, overlapping subsets, or some combination of non-overlapping and overlapping subsets. Random variables within each subset are conditioned on measurements and upscaled before being recombined into a single set estimating the entire domain. Due to the reduction in the number of random variables in each subset caused by the upscaling, this method is computationally feasible even for very large domains.

A further aspect of the invention is a method for estimating a domain's internal structure using direct measurements of one or more parameters describing the domain's interior and upscaling. A set of three-dimensional random variables represents one or more parameters describing the domain's internal structure. Prior estimates of first and second spatial moments of the random variables are based on the direct measurements, and then are upscaled to provide a random variable discretization on a larger scale than that of the initial discretization. When cluster analysis and random field union are used to embody the upscaling process, the resulting random variable discretization is reflective of the structural features of the domain, both in terms of the number of random variables used and the geometry of the spatial region of the domain that is represented by each random variable.

The present invention includes the aforementioned methods, as well as computer-readable media which contain instructions that cause a computer to perform those methods, and additionally computer systems which are designed to perform data measurements of signals traversing a domain, perform any of the aforementioned methods using those measurements, and output computed estimates of the internal structure of the domain.

The present invention offers several advantages over current state-of-the-art tomographic inversion methods. The approximate extended Kalman filter is a more accurate estimator than non-stochastic methods currently in use. Like the full extended Kalman filter, it yields estimates of second spatial moments (i.e., covariances) of parameters in addition to estimates of first spatial moments (i.e., means), explicitly accounts for error in parameter estimates, measurement error, and system noise of the simulator, and requires no additional regularization or smoothing. The approximate extended Kalman filter, however, is significantly more computationally efficient than the full extended Kalman filter. The use of upscaling, e.g., using cluster analysis followed by random field union, to decrease the number of random variables estimating the domain, increases the computational efficiency, stability, and sensitivity of the approximate extended Kalman filter in subsequent conditioning, without the risk of errors in zone geometry inherent in a priori zonation. Upscaling provides a means for structure detection; the user can control the resolution of heterogeneity through a cluster tolerance criterion. The method is fully three-dimensional. The introduction of domain decomposition strategies renders the method computationally feasible for estimation of very large domains.

BRIEF DESCRIPTION OF THE DRAWINGS

FIG. 15 is a graphical representation of the six bounding faces of a three-dimensional ground-penetrating radar propagation velocity estimate produced and output by the invention.

DETAILED DESCRIPTION OF THE INVENTION

The present invention relates to tomography and non-invasive structure identification, and more particularly, to apparatus and methods for estimating the internal structure of a physical domain based on tomographic measurements of aspects of signals having passed there through. The method and apparatus are general, and it will be apparent to one skilled in the art that the present invention is applicable to a wide variety of fields where it is useful to non-invasively (or minimally invasively) deduce the internal structure of a domain., including geophysical imaging, biomedical imaging, materials imaging, and the like. The invention includes methods for transforming aspects of physical signals (tomographic measurements) obtained from a physical domain into estimates of physical properties (parameters) of the physical domain, computer-readable media containing instructions to perform those methods, and systems that perform those methods.

Figure 1A:
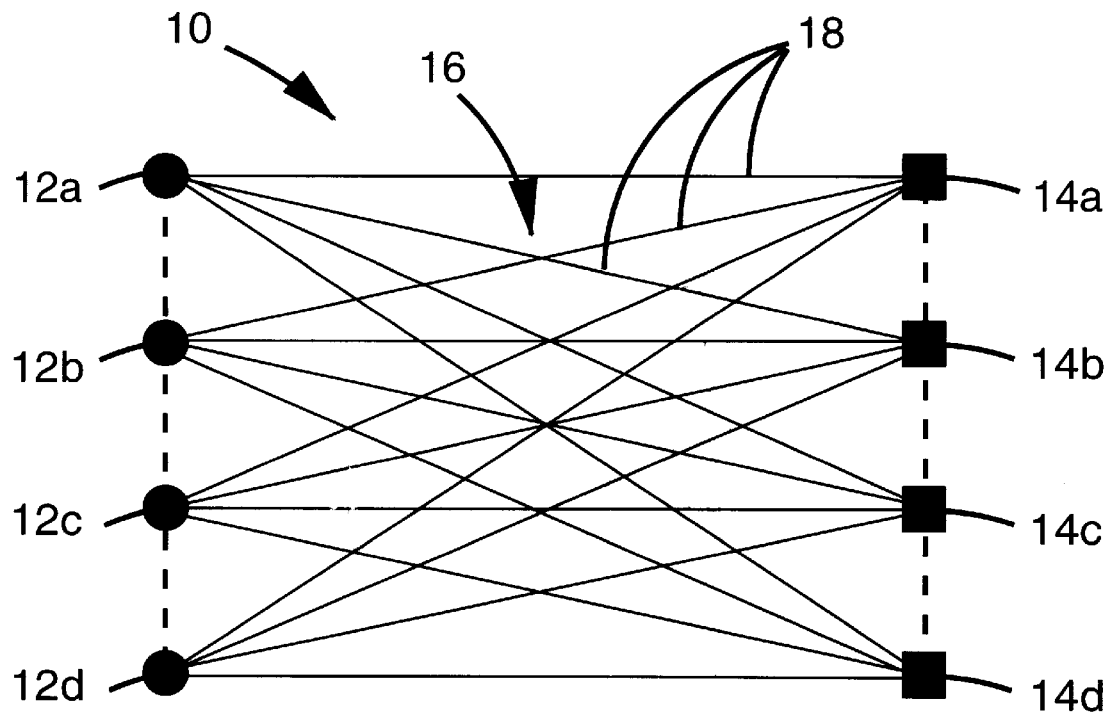
FIG. 1a illustrates a generalized two-dimensional tomographic measurement system.
Figure 1B:
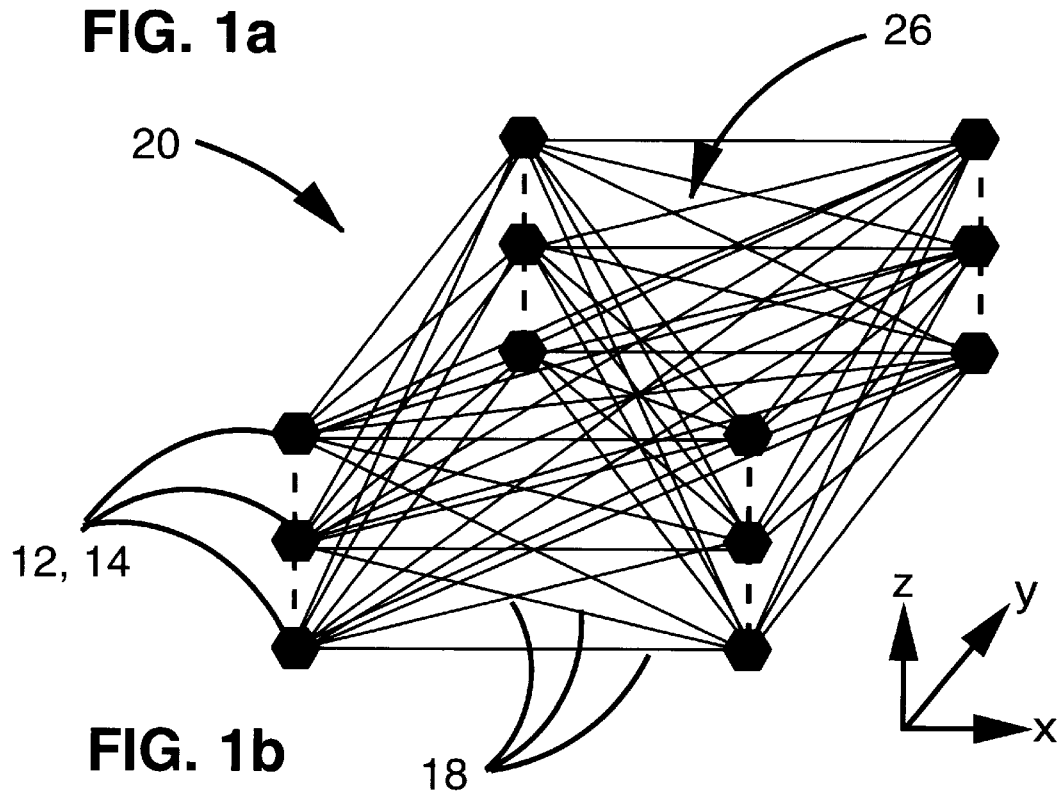
FIG. 1b illustrates a generalized three-dimensional tomographic measurement system.

With reference to FIG. 1a, one aspect of the present invention is a generalized two-dimensional (2-D) tomographic measurement system 10 that comprises a set of sources 12a–12d and a set of receivers 14a–14d proximate (i.e., within or adjacent) a domain 16. Signals 18 (depicted, for simplicity, as straight rays) travel through domain 16 from the sources 12 to the receivers 14 as shown. With reference to FIG. 1b, another aspect of the present invention is a generalized three-dimensional (3-D) tomographic measurement system 20, in which signals 18 travel through a 3-D domain 26 between sources 12 and receivers 14. In systems 10 and 20 of FIGS. 1a and 1b, signals 18 may occur simultaneously between multiple sources 12 and receivers 14, or sequentially in time between one or more sources 12 and receivers 14 that are relocated to various locations for successive signal transmissions. It will be apparent to one skilled in the art that signals 18 may traverse a domain in a variety of ways, including direct transmission, refraction, reflection, and diffraction. Signals 18 may be emitted from man-made or natural transmitting sources 12. Various aspects of the received signals may be measured (e.g., amplitude, traveltime, phase) and used as tomographic measurements.

While systems 10 and 20 of FIGS. 1a and 1b, respectively are shown organized in a rectilinear geometry, such a geometry is not necessary. Domains 16 and 26 may be arbitrarily shaped with non-uniformly positioned sources 12 and receivers 14. The types of sources 12, receivers 14 and signals 18 used depend on the nature of the internal structure of domains 16 and 26. For example, when domain 16 or 26 includes a section of the earth, sources 12 may be seismic sources, receivers 14 may be geophones, and signals 18 may be seismic waves. In this case, the actual tomographic measurements may be the travel times of the signals 18 from sources 12 to receivers 14, and the nature of the internal structure of domain 16 or 26 to be estimated may be, for example, seismic propagation velocities and lithologic structure may be inferred. Similarly, domain 16 or 26 may include a section of a man-made material body, such as a concrete bridge footing, and ground-penetrating radar signals 18 may be used to infer radar propagation velocities through the material and the structural integrity (e.g., location of discontinuities in the velocity structure) of the material may be inferred. When domain 16 or 26 includes a section of biological (e.g., human) tissues, sources 12 may be, for example, near-infrared laser diodes, signals 18 may be modulated light waves, and receivers 14 may be detecting modulation phase and amplitude of the modulated light. In this case, absorption and scattering coefficients of intervening tissues may be deduced and the presence of anomalies (such as tumors) may be inferred. In addition, if the modulated light waves 18 induce fluorescence or phosphorescence of embedded bodies, those bodies may become new sources 12 for transmitting re-emitted light signals 18. The present invention may also be applied to other inverse problems not typically considered to be tomographic problems, such as the groundwater inverse problem. For example, when domain 16 or 26 includes a vertically averaged section of saturated earth, sources 12 may be hydraulic sources and sinks (such as rainfall infiltration, evapotranspiration, and pumping), receivers 14 may be piezometers in wells, and signals 18 may be changing pressure fields. In this case, soil transmissivity (vertically averaged hydraulic conductivity) may be inferred from hydrologic measurements of piezometric head or pressure. There are numerous other potential applications of the method, particularly in geophysical, biomedical, and materials (i.e., man-made material bodies) imaging, using various types of signals to infer various parameters. The characteristics describing the internal structure of domains 16 and 26 are referred to as "parameters," and the measurable quantities as the "states" of system 10. As defined herein, 3-D subsumes 2-D and one-dimensional (1-D) cases, wherein one or two dimensions, respectively, are simply held constant.

Figure 2:
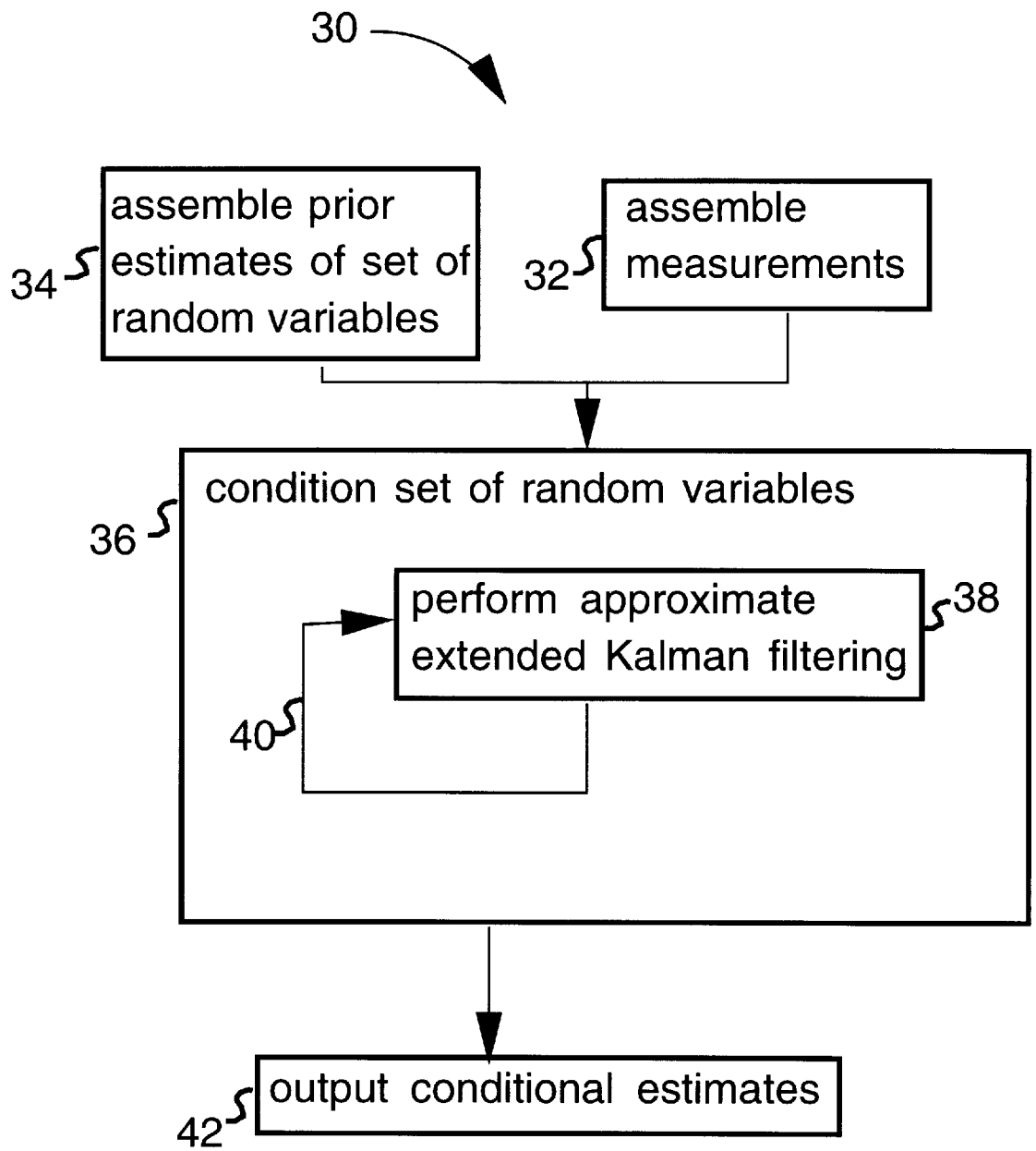
FIG. 2 is a flowchart describing the method steps for tomographically estimating a domain's internal structure using the approximate extended Kalman filter.

With reference now to FIG. 2, flowchart 30 describes the method steps for tomographically estimating a domain's internal structure using the approximate extended Kalman filter. In the first step, step 32, measurements Z are assembled, including tomographic measurements and possibly also including direct measurements of the parameter(s) in question. The assembling of measurements refers to the process of storing those measurements in a data structure in the memory of a computer, said measurements having been input directly from real-time detectors and/or input from a computer-readable medium on which the measurements had previously been stored. The present invention is a stochastic method, in which spatially-varying parameters (and optionally also states) are modeled with a set D containing a discrete number of random variables. Thus, in step 34, an initial estimate of this set of random variables is assembled. This estimate includes the random variable parameterization, the first spatial moments of the random variables (i.e., the means), and the second spatial moments of the random variables (i.e., the variances and covariances). The random variable parameterization comprises the number of random variables used (i.e., the level of discretization) and the geometry of the spatial region of the domain represented by each random variable (e.g., elements in a finite-element mesh). Thus, in the next step, step 36, the measurements obtained in step 32 are used to condition the prior estimates of the set of random variables assembled in step 34. Conditioning step 36 includes a step 38 of performing conditioning using the approximate extended Kalman filtering method of the present invention. In approximate extended Kalman filtering, a subset (which may include the entire set) of the measurements obtained in step 32 is used to perform updates of the first and second moments of the random variable estimates. Pseudo-code for the approximate extended Kalman filter is shown below:

Time Update:
x=states (at all grid locations) predicted from parameters y using a computer programmed forward simulator;
Measurement Update:

$$J = \frac{\delta x}{\delta y}$$

$$P^{xy} = JP^y$$

$$P^x = JP^yJ^T + Q$$

$$K^x = P^xH^T(R+HP^xH^T)^{-1}$$

$$K^y = (P^{xy})^TH^T(R+HPH^T)^{-1}$$

$$x = x + K^x(z-Hx)$$

$$y = y + K^y(z-Hx)$$

$$P^y = P^y - K^yHP^{xy}$$

wherein all notation is as described previously.

As with the full extended Kalman filter, one or more measurement updates may be performed during a given timestep. The approximate extended Kalman filter offers advantages over the extended Kalman filter, while still estimating the first and second moments of the random variables in the domain model. First, since all terms that included the transition matrix Φ have been removed from all computations except the forward prediction of states, the approximate extended Kalman filter is significantly faster than the extended Kalman filter. Second, since the state covariance matrix $P^x$ and the state-parameter cross covariance matrix $P^{xy}$ are estimated, and are not evolved, no prior estimates are required for these matrices in the approximate extended Kalman filter, and the updates for these matrices can be eliminated.

If the application warrants parameter estimation only, such as in typical tomographic imaging problems where the state (e.g., traveltime) is not maintained between source emission experiments, then the computation of the state gain matrix $K^x$ and the steps for computation of this matrix and for the measurement update of the vector of state variables x can be further eliminated. In this case, the Jacobion matrix J needs only to be calculated for the state variables at the measurement locations, thereby reducing the number of rows in this matrix from the total number of states to the number of measurements being used during any given measurement update. The sizes of matrices derived from the Jacobian J, including $P^{xy}$ and $P^x$, are similarly reduced in size. Since, in this case, the observation matrix H reduces to the identity matrix, it does not need to be explicitly included in the computations. The approximate extended Kalman filter for estimating parameters only is therefore reduced to the following pseudo-code:

Time Update:
x=states (at the measurement locations only) predicted from parameters y using a computer programmed forward simulator;

Measurement Update:

$$J = \frac{\delta x}{\delta y}$$

$$P^{xy}JP^y$$

$$P^x = JP^yJ^T + Q$$

$$K^y = (P^{xy})^T(R+P^x)^{-1}$$

$$y = y + K^y(z-x)$$

$$P^y = P^y - K^yP^{xy}$$

wherein
x is a vector of state variables at the measurement locations only; and all other notation is as described previously.

With continued reference to FIG. 2, conditioning step 38 may be iterated zero or more times via loop 40 using the same or different subsets of the measurements obtained in step 32. This corresponds to simply applying multiple measurement updates, with or without intervening time updates. Loop 40 can be exploited for several purposes. For example, it can be used to recursively incorporate time-series measurements, to sequentially incorporate smaller subsets of a large data set of stationary measurements to keep the size of the required matrix inversions arbitrarily small (for computational reasons), to iterate upon the same subset of measurements to help reduce errors due to non-linearities, or some combination of the above. Alternatively, all conditioning may be completed in the first pass through step 38, in which case no iteration occurs (i.e., loop 40 is executed zero times). Whenever conditioning by approximate extended Kalman filtering is referred to hereinafter in this disclosure, it implicitly includes the application of one or more measurement updates, as indicated by step 38 and loop 40. Next, in step 42, the resulting conditional estimates are outputted. In this, and in flow charts discussed hereinafter (i.e., flow-charts 50, 90, 120, 160, 190, 230, 250, 260, and 290 of FIGS. 3–7 and 9–12, respectively), the destination of the output may be to an output device (such as a graphical display unit), a storage device (such as a disk drive), or computer memory for use as input to another computer program.

Figure 3:
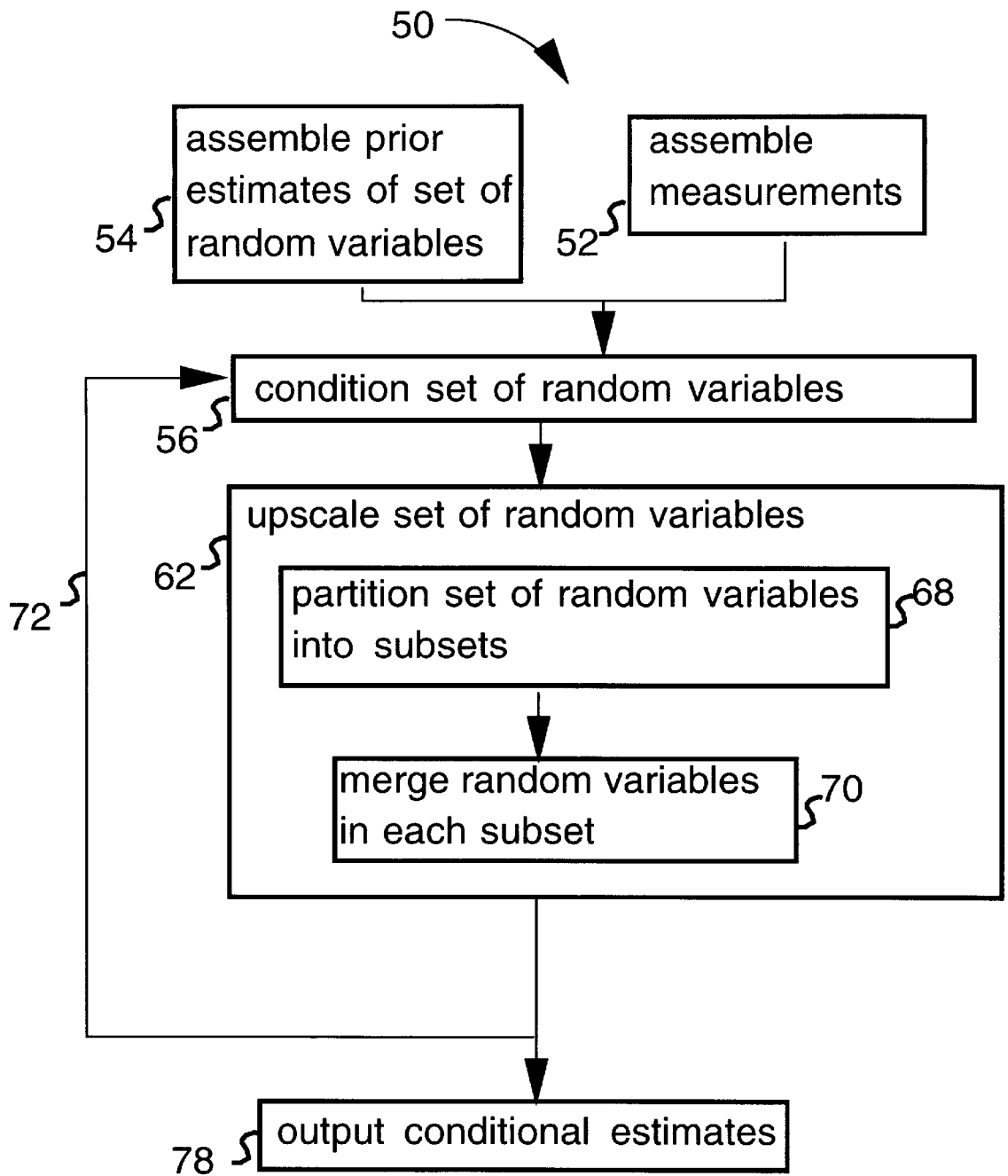
FIG. 3 is a flowchart describing the method steps for tomographically estimating a domain's internal structure by alternating stochastic data conditioning with upscaling.

With reference now to FIG. 3, flowchart 50 describes an embodiment of the present method for tomographically estimating the internal structure of domains 16 and 26 through the use of alternating measurement conditioning with upscaling. Steps 52 and 54 are identical to steps 32 and 34, described above in connection with flowchart 30 of FIG. 2. As the next step, step 56, the measurements assembled in step 52 are used to condition the prior estimates of the set of random variables assembled in step 54. In the method described in flowchart 50, and in the methods described in all flowcharts discussed hereinafter, the conditioning step may be accomplished using the approximate extended Kalman filter, as described above in connection with steps 38 and 40 of flowchart 30, or by some other known method of stochastic conditioning of first and second moments of random variables, such as the full extended Kalman filter or iterative co-kriging.

With continuing reference to FIG. 3, in the next step, step 62, the set of random variables from step 56 is upscaled. Upscaling consists of two steps. In the first step, step 68, the set of random variables D is partitioned into K nonintersecting subsets $S_i$, where i is an integer from 1 to K that indexes each subset. In this step, and in identical steps in all flowcharts discussed hereinafter, the partitioning step may be accomplished using cluster analysis of the random variables to identify subset membership. The number of subsets may be predetermined or may be dynamically determined in the cluster analysis. Next, in the second step, step 70, the random variables within each subset are merged into one random variable. Random variable merging entails the estimation of first and second moments of the merged random variables. The set of random variables estimating domains 16 or 26 is replaced by the reduced set of merged random variables.

In this, and all flowcharts discussed hereinafter, the random variable merging step may be accomplished by random field union, mentioned above and now discussed in greater detail below. Consider, for example, a set of random variables D and two members A and B of set D, A and B representing two spatial regions of domains 16 or 26 having relative sizes n and m, respectively. The two members A and B are to be merged into a new random variable C. A and B are also correlated with each of the other random variables E in the set D. By random field union, the first and second spatial moments of C are estimated by the following equations:

$$\hat{\mu}_C = \frac{n\hat{\mu}_A + m\hat{\mu}_B}{n + m}$$

$$\hat{\sigma}_{EC} = \frac{n\hat{\sigma}_{EA} + m\hat{\sigma}_{EB}}{n + m}$$

$$\hat{\sigma}_C^2 = \frac{n\hat{\sigma}_A^2 + m\hat{\sigma}_B^2}{n + m} + \frac{n(\hat{\mu}_C - \hat{\mu}_A)^2 + m(\hat{\mu}_C - \hat{\mu}_A)^2}{n + m}$$

wherein
$\hat{\mu}_A$=the estimated mean of A;
$\hat{\mu}_B$=the estimated mean of B;
$\hat{\mu}_C$=the estimated mean of C;
n=the size of A (area or volume);
m=the size of B (area or volume);
$\hat{\sigma}_A^2$=the estimated variance of A;
$\hat{\sigma}_B^2$=the estimated variance of B;
$\hat{\sigma}_C^2$=the estimated variance of C; and
$\hat{\sigma}_{Ei}$=the estimated covariance of E and i, i∈{A,B,C}, ∀E∈ (D−{A,B}).

The above equations are generalized to the merging of more than two random variables by simply repeated application of the above equations. In random field union, the variance of the merged random variable C is dependent on the difference between the means of the component random variables, A and B.

With continuing reference to FIG. 3, steps 56 and 62 may be iterated zero or more times via loop 72 to incorporate new measurements or to iterate upon the same measurements. If there are no new measurements to incorporate, if iteration on the same data is not deemed necessary (because residual error is assessed as adequately low after the first pass through steps 56 and 62), and/or if the user does not wish to expend the extra computational effort of iterating, then loop 72 may be executed zero times (i.e., no iteration occurs). Each time upscaling (step 62) is performed, the number of random variables used to model domains 16 or 26 is potentially decreased; if each subset in step 68 has exactly one element then the number of random variables will remain the same. When the number of random variables is decreased, the computational requirements of subsequent conditional estimation (step 56) are also decreased. The resulting conditional estimates are output in step 78 in the manner discussed above in connection with step 42 in flowchart 30 of FIG. 2.

Figure 4:
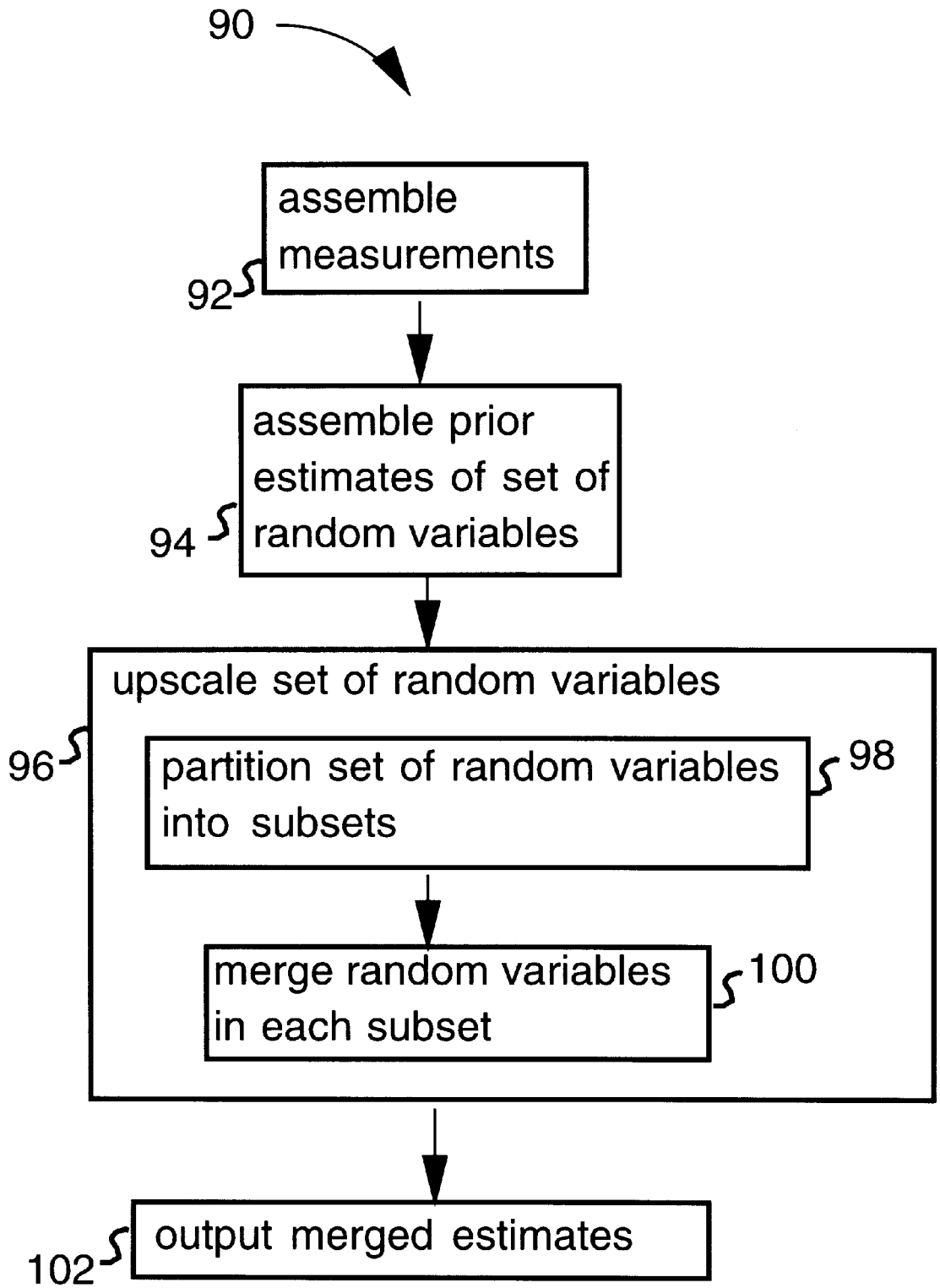
FIG. 4 is a flowchart describing the method steps for tomographically estimating a domain's internal structure by upscaling estimates of stochastic random variables.

With reference now to FIG. 4, flowchart 90 describes the present method of estimating the internal structure of domains 16 and 26 by upscaling prior estimates. First, in step 92, direct measurements of a spatially varying parameter that describes the interior of a domain 16 or 26 are assembled. Next, in step 94, a set of random variables D estimating the parameter in the domain 16 or 26 is assembled, whose first and second moments are estimated from the measurements assembled in step 92. Next, in step 96, the set of random variables estimated in step 94 is upscaled, as discussed above in connection with step 62 in flowchart 50 of FIG. 3. That is, first, in step 98, the random variables are partitioned into subsets. Then, in step 100, the random variables in each subset are merged. Finally, in step 102, the estimates of the merged random variables are output as discussed above in connection with step 42 in flowchart 30 of FIG. 2.

Figure 5:
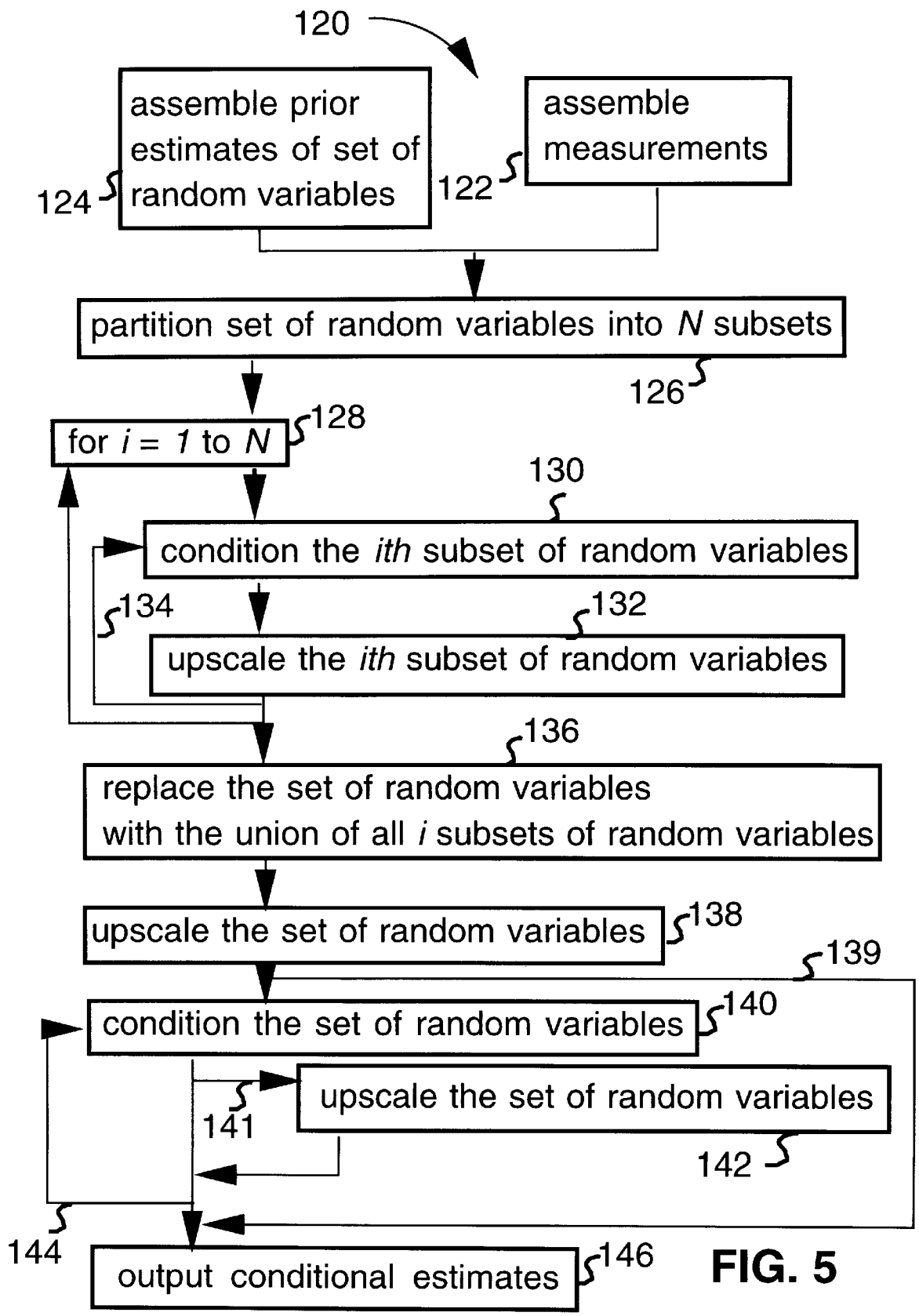
FIG. 5 is a flowchart describing the method steps for tomographically estimating a domain's internal structure by alternating stochastic data conditioning with upscaling within non-overlapping subdomains that are subsequently recombined.

As an example of the method described by flowchart 90 of FIG. 4, the measurements assembled in step 92 may be, for example, direct measurements of soil characteristics in a borehole (e.g., electrical conductivity) taken on a small scale (e.g., every inch). The set of random variables assembled in step 94 could be discretized onto nodes in a one-dimensional finite difference grid with 1 inch spacing between nodes, so that the initial estimates of first moments of these random variables are the measurements assembled in step 94. The upscaling in step 96 is then used to estimate the lithologic structure of the subsurface. The output of step 102 may then displayed on a graphical display unit or output to a storage device. With reference now to FIG. 5, flowchart 120 describes the steps of the present method for tomographically estimating the internal structure of domains 16 and 26 by alternating measurement conditioning with upscaling using a non-overlapping domain decomposition strategy. This is useful when the number of random variables used to describe the domain 16 or 26 is very large and the method described in flowchart 50 (FIG. 3) is not computationally practical. For example, if the computer memory or programming language precludes the storage and manipulation of the large covariance matrices $P^x$, $P^y$, or $P^{xy}$ for all parameter and state variables in the entire domain 16 or 26, if the computation time required for those matrix manipulations is insufficiently fast, and/or if the program is to be run on a multiprocessor, then the method put forth in flowchart 120 may be preferable to that put forth in flowchart 50. Steps 122 and 124 are identical to steps 32 and 34 discussed above in connection with flowchart 30 of FIG. 2. Next, in step 126, the set D of random variables assembled in step 124 is partitioned into N (one or more) non-intersecting subsets $D^i$ (where i is an integer from 1 to N that indexes each subset) estimating independent subdomains, such that the correlation between random variables in distinct subsets is assumed to be zero. Next, in steps 130 and 132, each of these N subsets, as indicated by loop 128, is conditioned (step 130) and upscaled (step 132) zero or more times via loop 134, as described for steps 56 and 62 and loop 72 in flowchart 50 of FIG. 3. Note that the subset of measurements used to condition each subset must be between the sources 12 and the receivers 14 within or adjacent the spatial subdomain modeled by that subset (see FIG. 1). Loop 128 may be performed sequentially or in parallel (on a multiprocessor), since conditioning step 130 and upscaling step 132 are independent of each other.

With continuing reference to FIG. 5, next, in step 136, the subsets of random variables are recombined by set union. Then, in step 138, the subsets are upscaled. This can either be done sequentially as shown, or one or more subsets can be recombined through set union and upscaled, then one or more of the remaining subsets is added into that set by set union and upscaled, etc., until all subsets have been combined by set union into one set and upscaled. The final upscaled set of random variables replaces the set of random variables estimating the domain. If the resulting estimate is sufficient to meet the user's needs, branch 139 may be selected and the results output. Alternatively, the upscaled set may be further conditioned in step 140. If there is need for further upscaling to reduce the number of random variables being used or to more clearly delineate structural features in the domain, branch 141 may be selected and the set of random variables will be upscaled again in step 142. As described with reference to loop 72 in flowchart 50 of FIG. 3, conditioning and upscaling may be further repeated zero or more times via loop 144. The resulting conditional estimates are output in step 146 as discussed above in connection with step 42 in flowchart 30 of FIG. 2.

Figure 6:
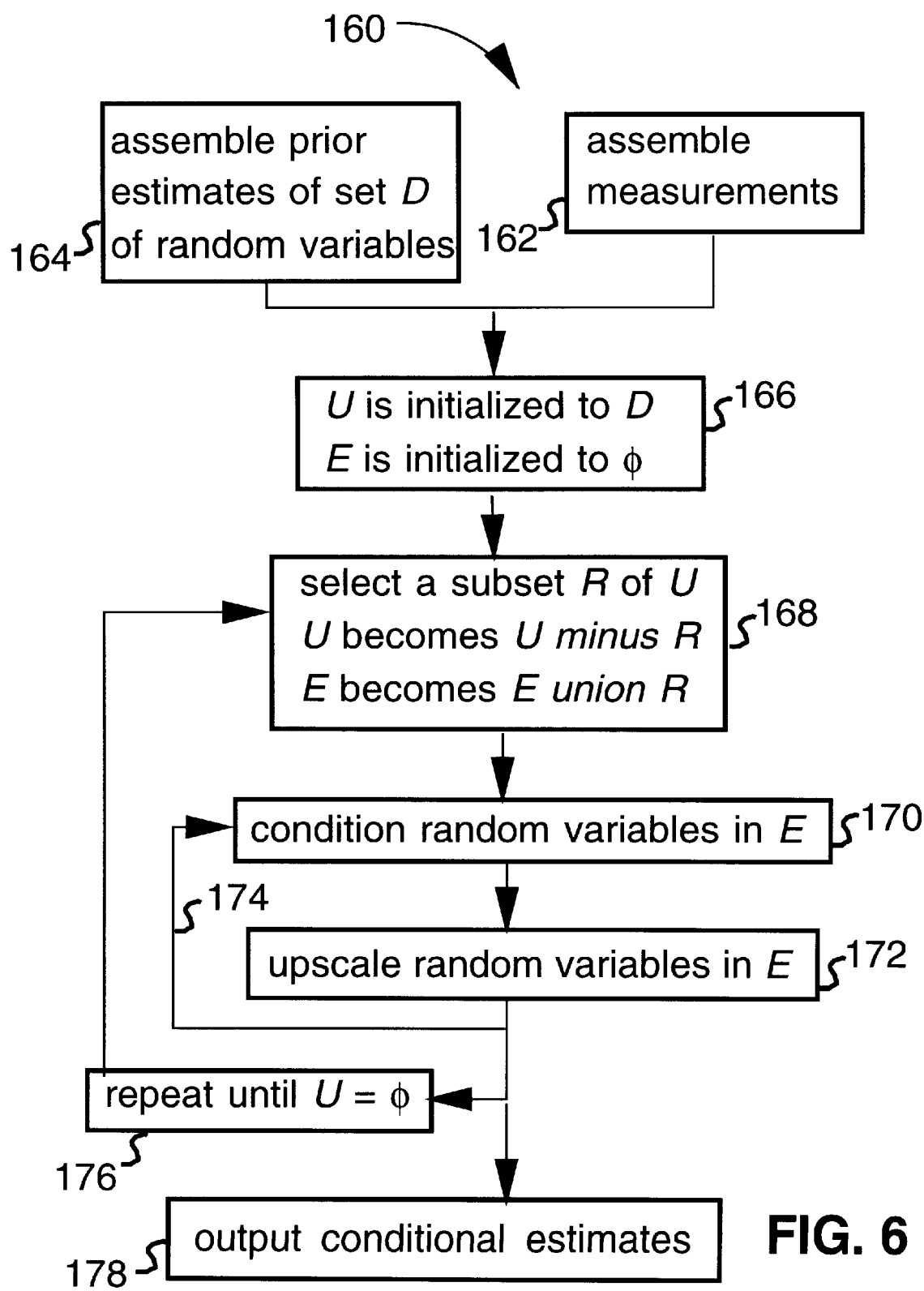
FIG. 6 is a flowchart describing the method steps for tomographically estimating a domain's internal structure by alternating stochastic data conditioning with upscaling within overlapping subdomains that are successively enlarged until they encompass the entire domain.

With reference now to FIG. 6, flowchart 160 describes the steps of the present method for tomographically estimating the internal structure of domains 16 and 26 by alternating measurement conditioning with upscaling using an overlapping domain decomposition strategy. This method is useful when the number of random variables used to describe the domain is very large and the method put forth in flowchart 50 of FIG. 3 is not computationally practical (as previously discussed with reference to flowchart 120 of FIG. 5), when the measurement density is not high enough to adequately support the method described in flowchart 120 of FIG. 5, and/or when out-of-plane effects are expected to be high and the independent subdomain decomposition approach put forth in flowchart 120 of FIG. 5 is expected to cause unacceptably high errors. The first two steps in flow chart 160, steps 162 and 164, are identical to steps 32 and 34 discussed above in connection with flowchart 50 of FIG. 3. The set of random variables assembled in step 164 that model the domain is referred to as set D. Next, in step 166, two sets are defined: a) a set U representing the undefined portion of the domain, which is initialized to the set D, and b) a set E, representing the estimated portion of the domain, which is initialized to the empty set φ. Next, in step 168, a subset R is removed from set U by set difference and added to set E by set union. The set R is selected such that the set E will always contain only random variables that represent a spatially contiguous portion of the domain. Then, in steps 170 and 172, the random variables in E are conditioned and upscaled as discussed above in connection with steps 56 and 62 in flowchart 50 of FIG. 3. Steps 170 and 172 are iterated zero or more times via loop 174, as described for loop 72 in flowchart 50. Next, steps 168, 170, and 172 are repeated until the set U has been reduced to the empty set Φ(i.e., the entire domain has been estimated). The resulting conditional estimates are output in step 178 as discussed above in connection with step 42 in flowchart 30 of FIG. 2.

Figure 7:
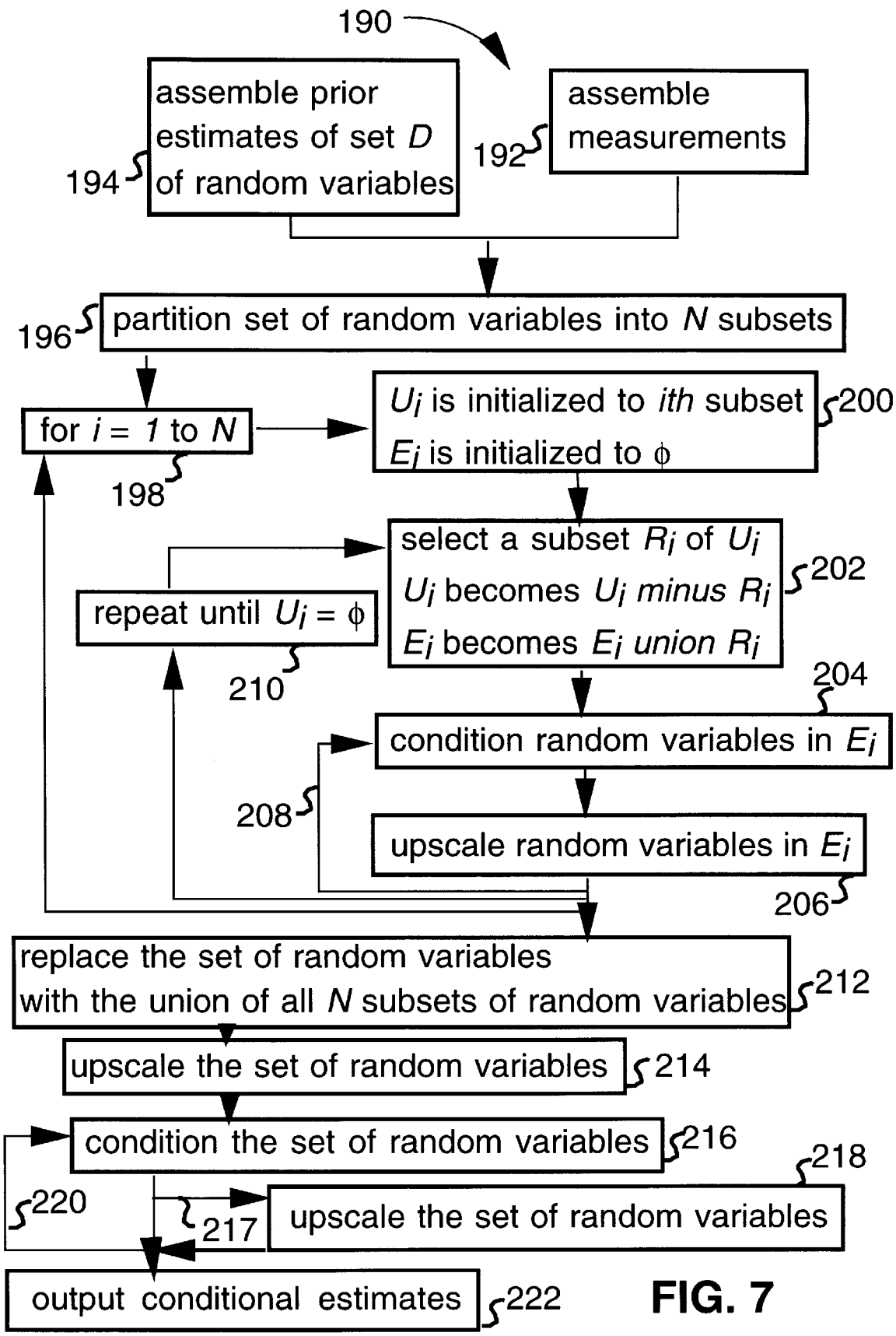
FIG. 7 is a flowchart describing the method steps for tomographlically estimating a domain's internal structure by alternating stochastic data conditioning with upscaling using a combination of overlapping and non-overlapping subdomains.

With reference now to FIG. 7, flowchart 190 describes the present method of tomographically estimating the internal structure of domain 16 and 26 by alternating measurement conditioning with upscaling using a combined non-overlapping and overlapping domain decomposition strategy. This method is useful when the number of random variables used to describe the domain 16 or 26 is very large and combines the advantages of the methods put forth in flowcharts 120 and 160 of FIGS. 5 and 6, respectively. For example, the use of overlapping subdomains reduces out-of-plane effects and can accomodate sparse and non-uniform measurements, while the use of independent subdomains facilitates efficient parallelization onto a multiprocessor, or memory paging on a uniprocessor. In flowchart 190, the first two steps, steps 192 and 194, are identical to steps 32 and 34 described above in connection with flowchart 30 of FIG. 2. Then, in step 196, the set of random variables assembled in step 194 is partitioned into N non-intersecting subsets $D_i$ (where i is an integer from 1 to N that indexes each subset) estimating independent subdomains, such that the correlation between random variables in distinct subsets is assumed to be zero. Each of these N subsets (as indicated by loop 198), is estimated in steps 200 through 210 using the overlapping domain decomposition method, as in steps 166 through 176 discussed above in connection with flowchart 160 of FIG. 6. Note that the subset of measurements used to condition each of the N subsets of random variables must be between the sources and the receivers within or adjacent the spatial subdomain modeled by that subset of random variables (see FIG. 1). Loop 198 may be performed sequentially or in parallel, since the conditioning (step 204) and upscaling (step 206) of the N subsets are independent of each other. Next, in step 212, the subsets of random variables are recombined through set union and then upscaled in step 214. This can be done sequentially as shown or, alternatively, one or more subsets can be combined through set union and upscaled, then one or more of the remaining subsets added into that set by set union and upscaled, etc., until all subsets have been combined by set union into one set and upscaled. The final upscaled set of random variables replaces the set of random variables estimating the domain. This upscaled set may be further conditioned in step 216 and optionally upscaled in step 218 via branch 217 zero or more times via loop 220. The resulting conditional estimates are output in step 222, as discussed above in connection with step 42 in flowchart 30 of FIG. 2.

Without loss of generality, now described is a specific example application using the method set forth in flowchart 160 of FIG. 6 in the context of one-way wave traveltime inversion for the estimation of spatially heterogeneous propagation velocity. The effectiveness of the present invention on an inversion of ground-penetrating radar travel times through a three-dimensional section of earth is thus demonstrated.

A specific embodiment of the method set forth in flowchart 160 of FIG. 6 is written primarily in the Matlab (Version 5) programming language, with the forward simulator discussed hereinafter written in the ANSI C programming language and linked to the Matlab program via Matlab "mex" files. The program is stored on a computer-readable medium (disk), and is executed on a Silicon Graphics computer system, including a 200 MHz processor and 256 MB of RAM. Measurements are input from ASCII text files loaded from disk, and generated estimates are output to data files on disk as well as graphically output (as shown in FIGS. 15 and 16, discussed hereinafter) using Matlab graphical display functions.

The natural logarithm (log) of propagation slowness in the domain, where slowness is the inverse of velocity, is modeled as a set of random variables representing the spatial regions surrounding nodes in a right rectangular 3-D finite difference grid. Log slowness (parameter) values (y) are transformed to velocity values, which are interpolated between the nodes to provide a continuous velocity estimate of the spatial domain. First arrival traveltime (state) values (x) are simulated at each node in the grid using a forward simulator. Our prototype implementation uses a forward simulator which implements the nonlinear planewave extrapolation method, as discussed in the Ph.D. dissertation by Matarese, entitled "Nonlinear Traveltime Tomography," M.I.T., Cambridge, Mass., 1993. This forward simulator is a computer program which uses the physics of wave propagation along with discrete estimates of propagation velocities at the nodes to predict first arrival travel times from a source located at any given node to all other nodes in the finite difference grid.

Figure 8:
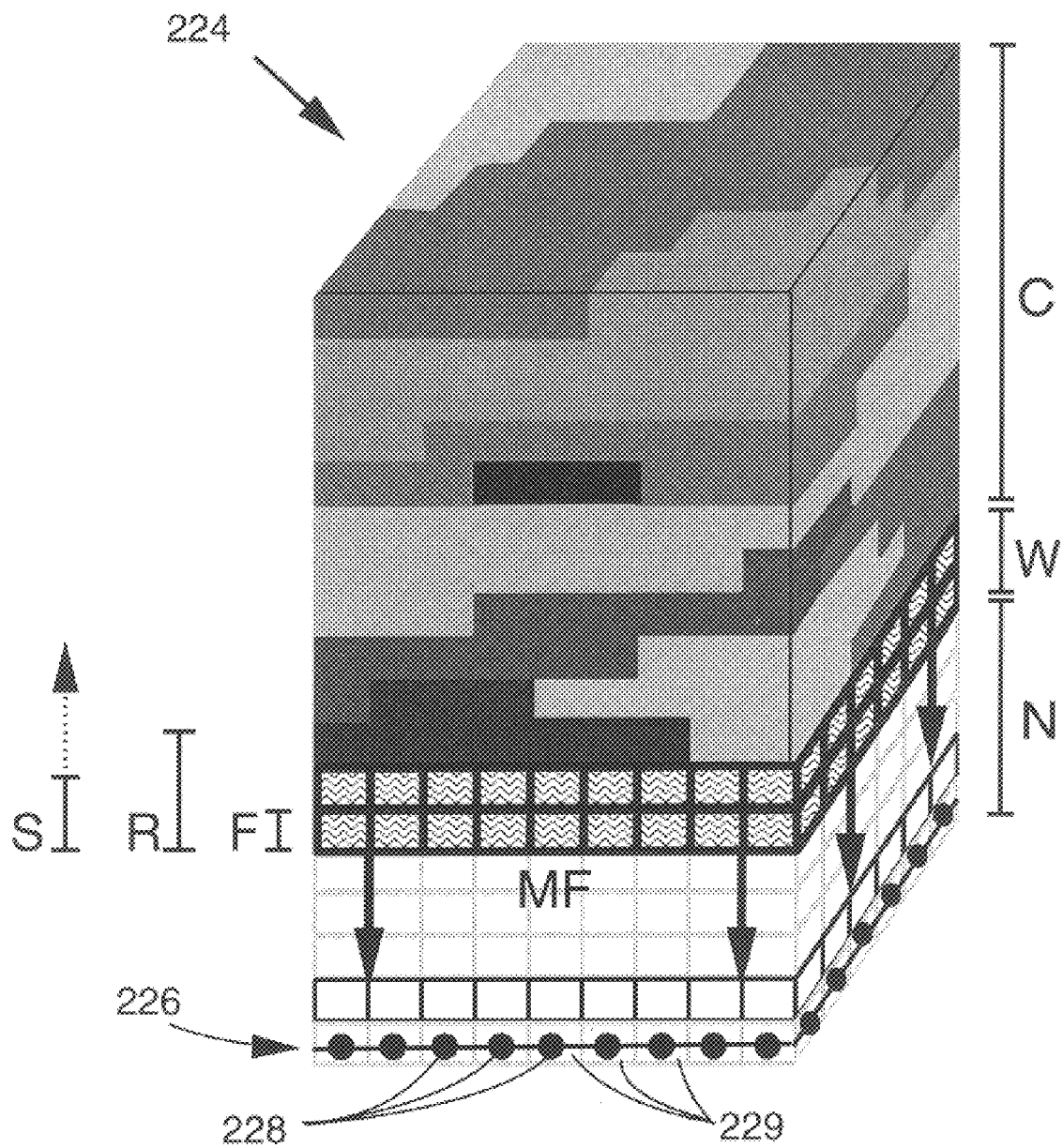
FIG. 8 graphically depicts one preferred embodiment of the method of tomographically estimating a domain's internal structure by alternating stochastic data conditioning with upscaling within overlapping subdomains that are successively enlarged until they encompass the entire domain.

With reference now to FIG. 8 in this implementation, the heterogeneous, isotropic log slowness field for a 3-D domain 224 is estimated incrementally from the top down. Conditioning is performed sequentially within 3-D overlapping subdomains using a "sliding window" of zones W, comprising a number of parallel horizontal planes of the 3-D domain model (3-D finite difference grid). In this context, the term "plane" refers to the set of random variables which model the nodes in a 2-D horizontal slice of the 3-D finite difference grid, as shown by an example plane 226 in FIG. 8. For simplicity, only the nodes 228, on the front two edges of the bottommost plane 226 are depicted in FIG. 8. Also for simplicity, each cell 229 surrounding a node above the moving front MF is shaded homogeneously (the various shadings graphically representing different propagation velocities), even though the propagation velocities are actually interpolated smoothly between nodes 228 in this particular implementation and are not homogeneous within cells 229 surrounding the nodes 228. During a given round (iteration) of conditioning, only those traveltime measurements from sources 12 in a source window S (not shown in FIG. 8) to receivers 14 (not shown in FIG. 8) in a receiver window R located in or just above sliding window W are used to condition the estimates. Some sources 12 and/or receivers 14 may lie above conditioning window W. However, the raypaths between the same traverse window W and hence provide information useful for conditioning. The size of source window S may be adaptively increased if there are an inadequate number of raypaths (not shown) traversing window W.

Figure 9:
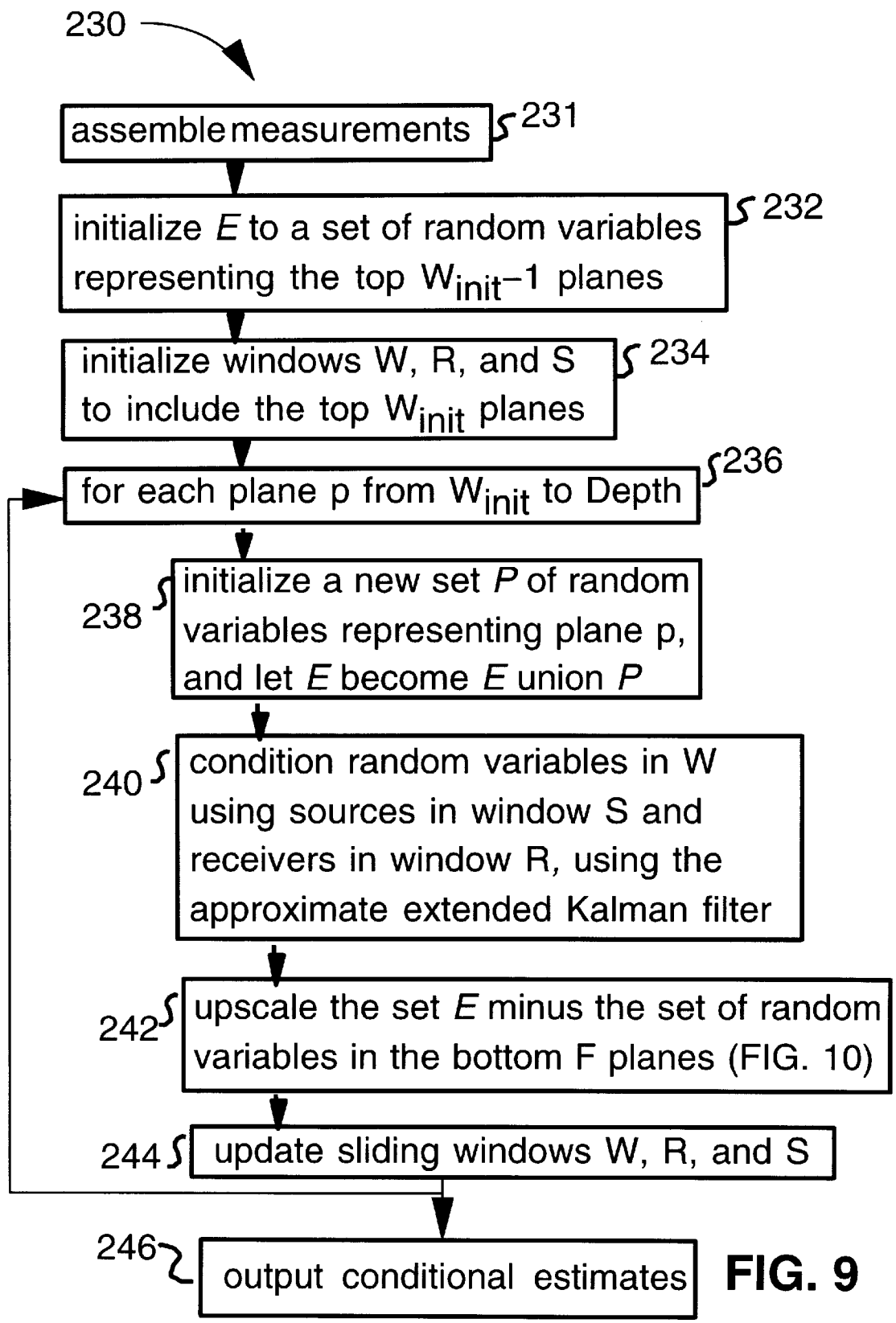
FIG. 9 is a flowchart describing the method steps for one preferred embodiment (as graphically depicted in FIG. 8) of the method of tomographically estimating a domain's internal structure by alternating stochastic data conditioning with upscaling within overlapping subdomains that are successively enlarged until they encompass the entire domain.

With continuing reference now to FIG. 8 and also to flow chart 230 of FIG. 9, the method of reconstructing the internal structure of domain 224 shown in FIG. 8 is now described. In the first step, step 231, tomographic measurements consisting of first arrival travel times from sources 12 to receivers 14 within or adjacent the domain 26 are assembled. In the example application, these measurements are first arrival travel times read from files on disk, each of which was previously picked from 64 stacked transmissions of 100 MHz ground-penetrating radar signals emitted from the sources 12 and detected at the receivers 14. Next, in step 232, the initial size of the sliding conditioning window W is chosen to ensure an adequate number of sources for the initial conditioning. In FIG. 8, depicting the example application, $W_{init}$ consisted of the 7 top planes of domain 224. Next, in step 234, windows W, R, and S are initialized to include the top $W_{init}$ planes. Next, in loop 236, additional planes p are added into the growing domain model one plane p during each repetition of the body of loop 236, until the entire depth of domain 224 is modeled. Inside loop 236, in step 238, each new plane p is initialized according to a priori assumptions on mean and horizontal covariance structure within the plane. In the example application, a negative exponential horizontal covariance structure, with a horizontal correlation length of 3.048 m, is assumed. Assumptions are made a priori that log slowness was distributed normally, with a mean of 2.42 and a variance of 0.03, corresponding to an initial velocity estimate of 0.09 m/ns and a variance of $2.5410^{-4}$ $m^2s^2$. These assumptions are based on preliminary data collected at the test site. The zones between distinct planes p are initially assumed uncorrelated.

Next, in step 240, the log slowness random variables are conditioned recursively using the approximate extended Kalman filter for parameter estimation only, where (for a given measurement update) the state vector x is the vector of predicted traveltimes from one source in S to all receivers in W, and the parameter vector y is the vector of log slowness estimates. The Jacobian matrix J is set to zero for all parameters outside of active conditioning window W. In the example application, it is assumed that measurement errors are independent in space and time with a constant variance, and that system noise is similarly independent with a constant variance. Correlation structure and variance are determined on a case-by-case basis using prior information for each particular application. For the present example application, a constant measurement error variance of 10 $ns^2$ and a constant system error variance of 5 $ns^2$ is assumed. Within the conditioning step 240, measurement updates are repeated for each subset of measurements corresponding to common source travel times for each source in source window S to all receivers in receiver window R. The dimension of the matrix $(R+P^x)$ to be inverted is thereby limited to the maximum number of receivers in the receiver window R for sources emitted from within source window S (see FIG. 8).

Since domain 224 (see FIG. 8) is constructed incrementally, the size of the parameter spatial covariance matrix $K^y$ varies dynamically with the number of zones in the previously conditioned portion of the domain model C and in active conditioning window W. The covariance matrix of the fully distributed parameters for the whole domain is never required. After performing conditioning in step 240, upscaling is applied in step 242 to all zones in W, except those in the bottom F free planes (F is defined to be one plane, in the example application). The zones in W are combined with pre-existing 3-D zones in C, where possible, using cluster analysis followed by random field union. By allowing the number of free (unclustered) planes F to be nonzero, random variables have the opportunity to be conditioned more than once before they are clustered and merged. This is important, since estimation errors due to boundary effects will be most pronounced at the bottom of conditioning window W, where estimated raypaths are constrained to lie above moving front MF. The specifics of the upscaling algorithm for the example application are described in flowchart 250 of FIG. 10, discussed below.

With continuing reference to FIGS. 8 and 9, following upscaling in step 242, in step 244, sliding windows W, R, and S are updated. Each repetition of loop 236 corresponds to lowering the moving front MF by one plane p. For the example application, W is defined to be the bottom two planes above moving front MF, R is defined to be the bottom three planes above the moving front, and S is defined to be the bottom two or more planes above the moving front (if an inadequate number of traveltime measurements are available in the bottom 2 planes, the top of source window S is raised). When loop 236 terminates, the entire domain 224 has been estimated, and the resulting conditional estimates are output in step 246, as discussed above in step 42 in connection with flowchart 30 of FIG. 2. The steps in flowchart 230 of FIG. 9 are one specific embodiment of the steps in flowchart 160 of FIG. 6, although flowchart 160 is written in a much more general form.

Figure 10:
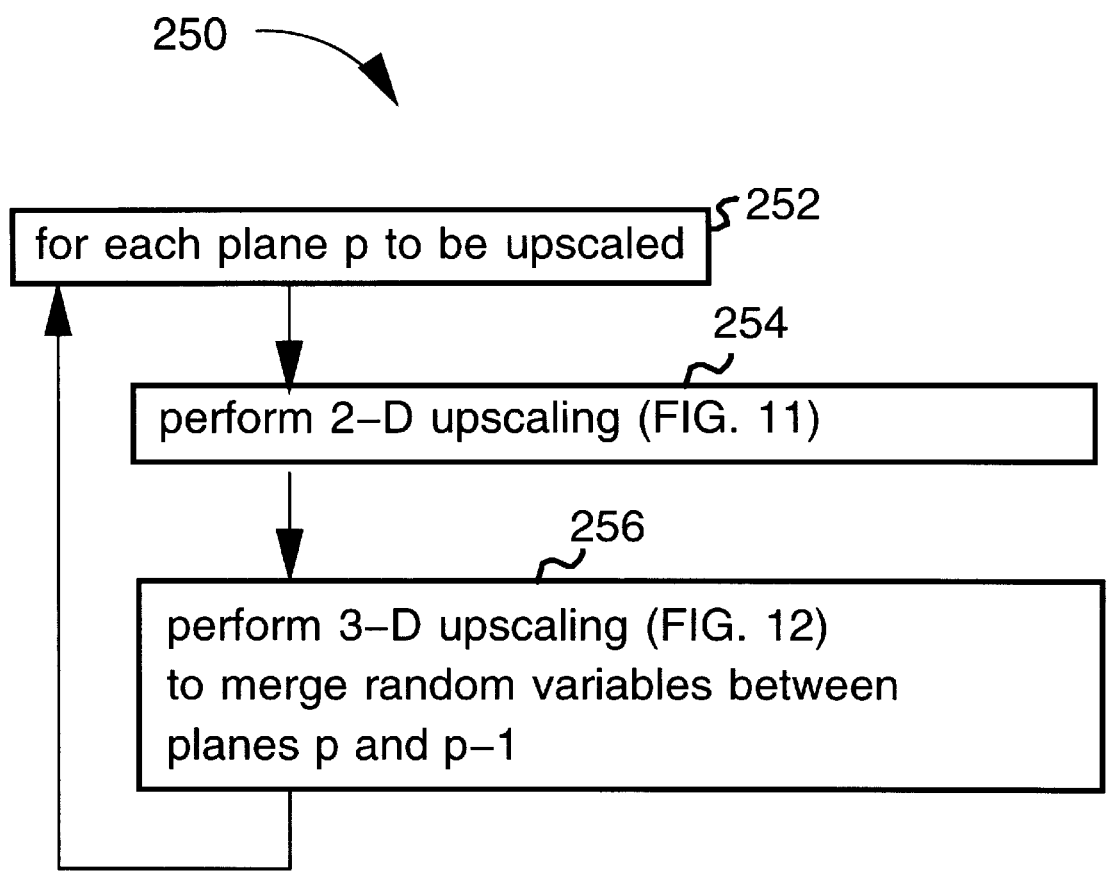
FIG. 10 is a flowchart describing the method steps for one preferred embodiment of the three-dimensional upscaling process.

With reference now to FIG. 10, flowchart 250 describes the steps in the high-level cluster analysis algorithm employed in the example application associated with step 242 of FIG. 9. Starting with loop 252, every plane p to be upscaled is first upscaled in two (horizontal) dimensions in step 254, as described in FIG. 11, below. Then, in step 256, this plane is upscaled with the plane immediately above it in the third (vertical) dimension, as described in FIG. 12, below.

Figure 11:
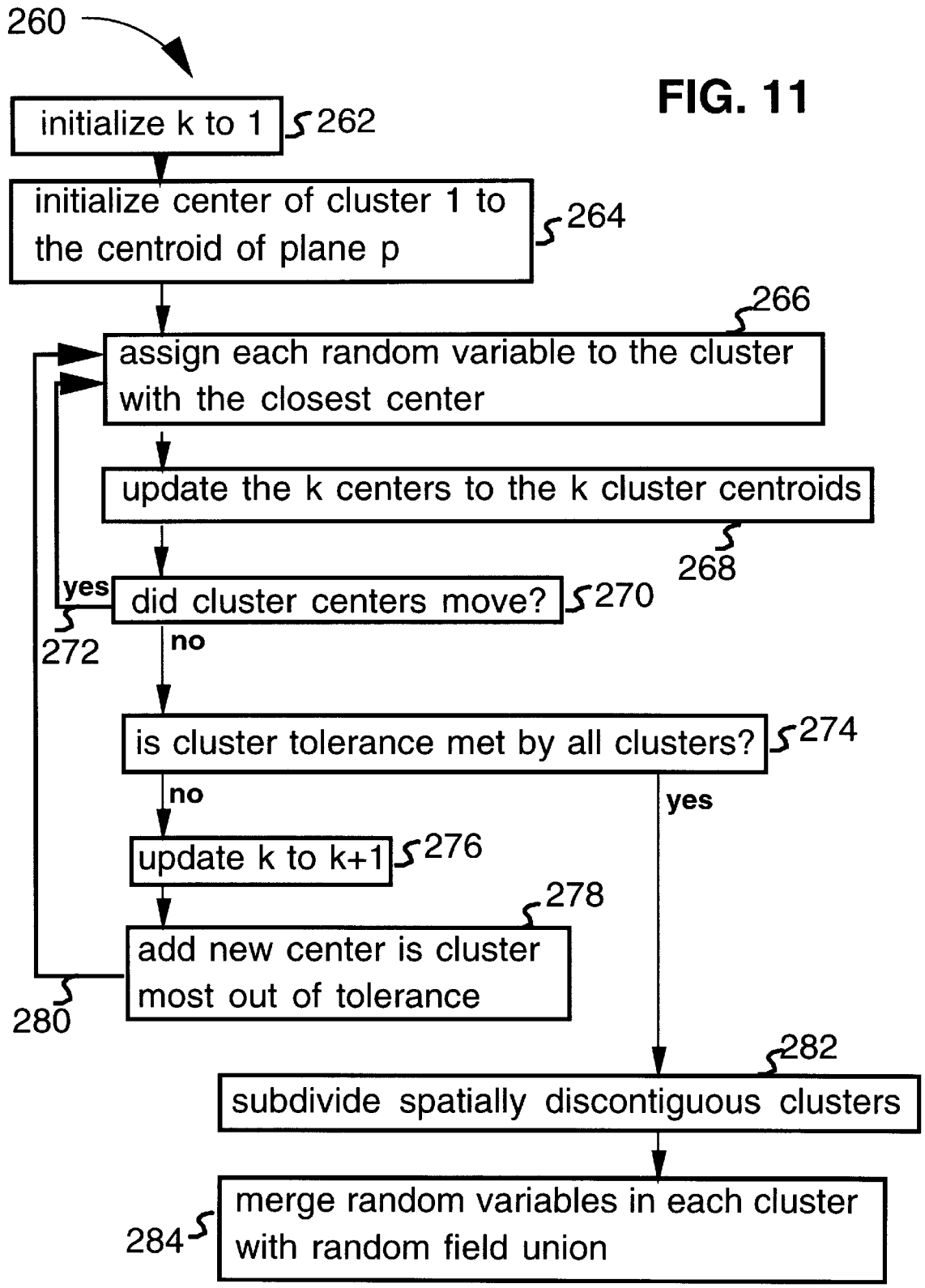
FIG. 11 is a flowchart describing the method steps for one preferred embodiment for two-dimensional upscaling.

With reference now to FIGS. 8 and 11, flowchart 260 describes the steps for 2-D upscaling of the random variables within a given horizontal plane p, identified as step 254 in flowchart 250 in FIG. 10. This algorithm is a divisive partitional cluster analysis method that determines how many clusters to use. The method employs a k-means clustering algorithm to determine how to partition the random variables into a given number of clusters. Clustering is performed using the current estimates of the mean velocity (i.e. transformed from log slowness) for each random variable. In the first step, step 262, the number of clusters is initialized to one. Then, in step 264, the cluster "center" is defined as the centroid (i.e., the arithmetic average) of the velocity estimates of all random variables in the given plane p. Next, in step 266, each random variable is assigned membership to the cluster whose center is arithmetically closest to the current estimate of the mean of the velocity. Then, in step 268, the cluster centers for each of the k clusters are recomputed to be the centroids of the means of the random variables in each cluster. Then, in step 270, a test is performed to determine if the cluster centers have moved significantly (i.e., to within some specified tolerance level, which was set to 1% of the maximum intercluster centroid difference in the example application). If the cluster centers moved, then the k-means clustering algorithm is repeated, as shown by loop 272. If the cluster centers did not move, then, in step 274, a test is performed to determine if all clusters meet a cluster tolerance criterion. In this implementation, a cluster is determined to be within tolerance if all velocities of zones in the cluster are within a "cluster tolerance criterion" T of the cluster centroid. The cluster tolerance criterion T determines how liberal the algorithm is in combining zones, and hence determines the resulting number of zones in the final estimate. The cluster tolerance criterion can be a relative value, based on the current range of estimated values. Alternatively, it can be an absolute value (as in the example application), if a reasonably good estimate of the expected parameter range is know. The cluster tolerance criterion may be allowed to vary dynamically in response to the amount of information that is accrued into the model.

With continuing reference to FIGS. 8 and 11, next, in step 276, if the cluster tolerance criterion is not met by all clusters, then the number of clusters is increased by one. Then, in step 278, a new cluster is added into the cluster that is most out of tolerance. Next, via loop 280, the k-means clustering algorithm is again employed to find the best clustering into the k clusters. When all the clusters meet the cluster tolerance criterion, then in the next step, step 282, spatial contiguity of clusters is enforced by subdividing the clusters into the fewest number of spatially contiguous clusters. That is, the random variables in each cluster must represent spatially contiguous portions of the domain. When 2-D clustering is complete, in the next step, step 284, the random variables within each cluster are merged using random field union.

Figure 12:
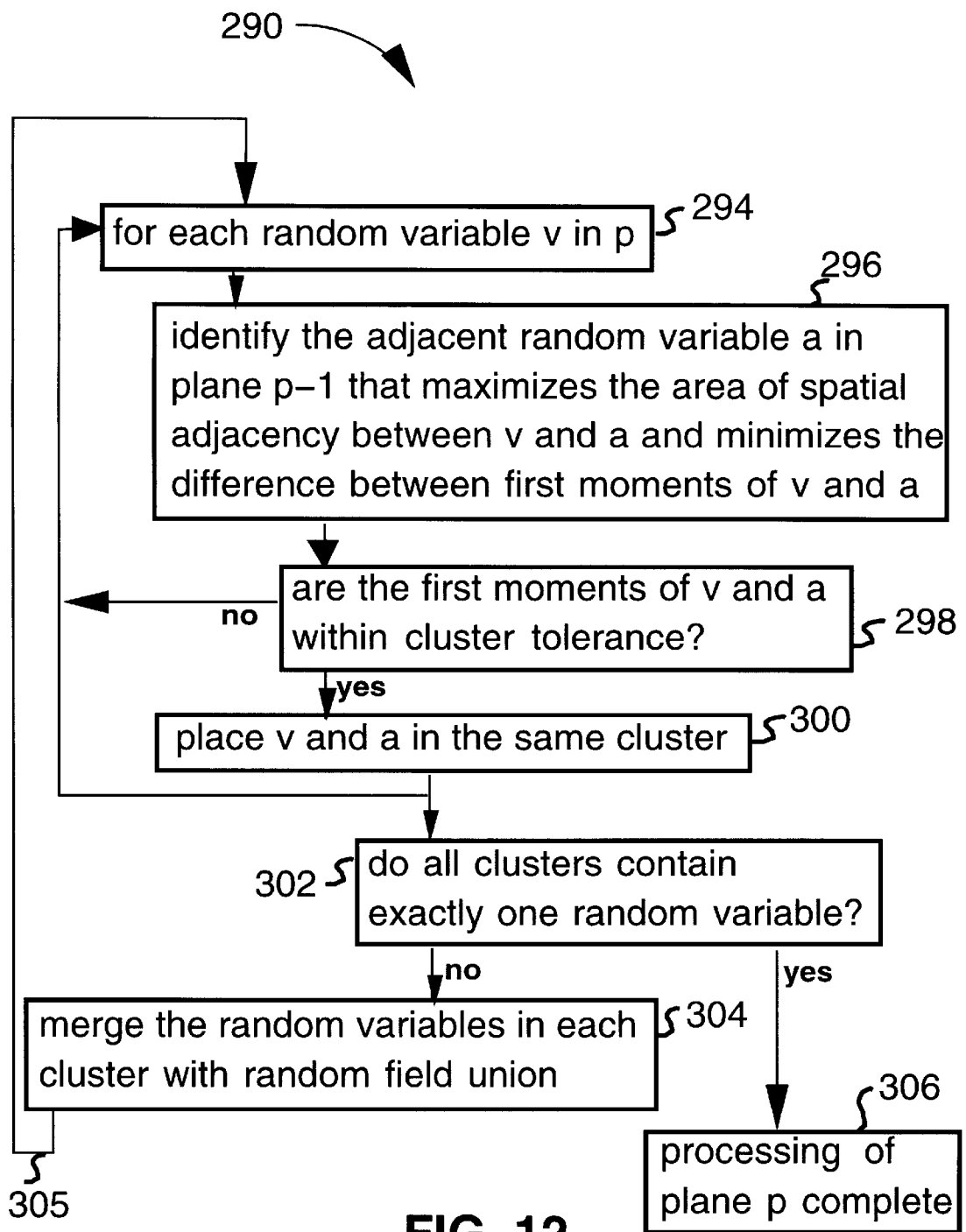
FIG. 12 is a flowchart describing the method steps for one preferred embodiment for upscaling in the third dimension.

With reference now to FIG. 12, flowchart 290 describes the method steps for 3-D upscaling of the random variables in a given number of adjacent planes, using an iterative pairwise clustering algorithm, which method is identified as step 256 in flowchart 250 in FIG. 10. In the first step, step 294, a random variable v in the plane p is chosen. Then, in step 296, the adjacent random variable a in the plane p above it is identified that maximizes the areal overlap of the spatial regions of the domain represented by random variables v and a and that minimizes the difference between the velocity estimates of v and a. Then, in step 298, a test is performed to determine if the velocity estimates of v and a meet a given cluster tolerance criterion. If so, then in step 300, v and a are placed in the same cluster. Once all the variables v have been processed by loop 294, in the next step, step 302, a test is performed to see if all the clusters contain exactly one random variable. If the result to the test at step 302 is negative, then in step 304, the random variables in clusters that contain more than one random variable are merged using random field union, and steps 294 through 302 are iterated via loop 305 until the result to the test in step 302 is affirmative. At this point processing of plane p is complete, as indicated in step 306.

To summarize, random variables are thereby clustered and merged first horizontally then vertically. The upscaling process terminates when the zones have been clustered into the fewest number of clusters for which all clusters are within tolerance.

Figure 13:
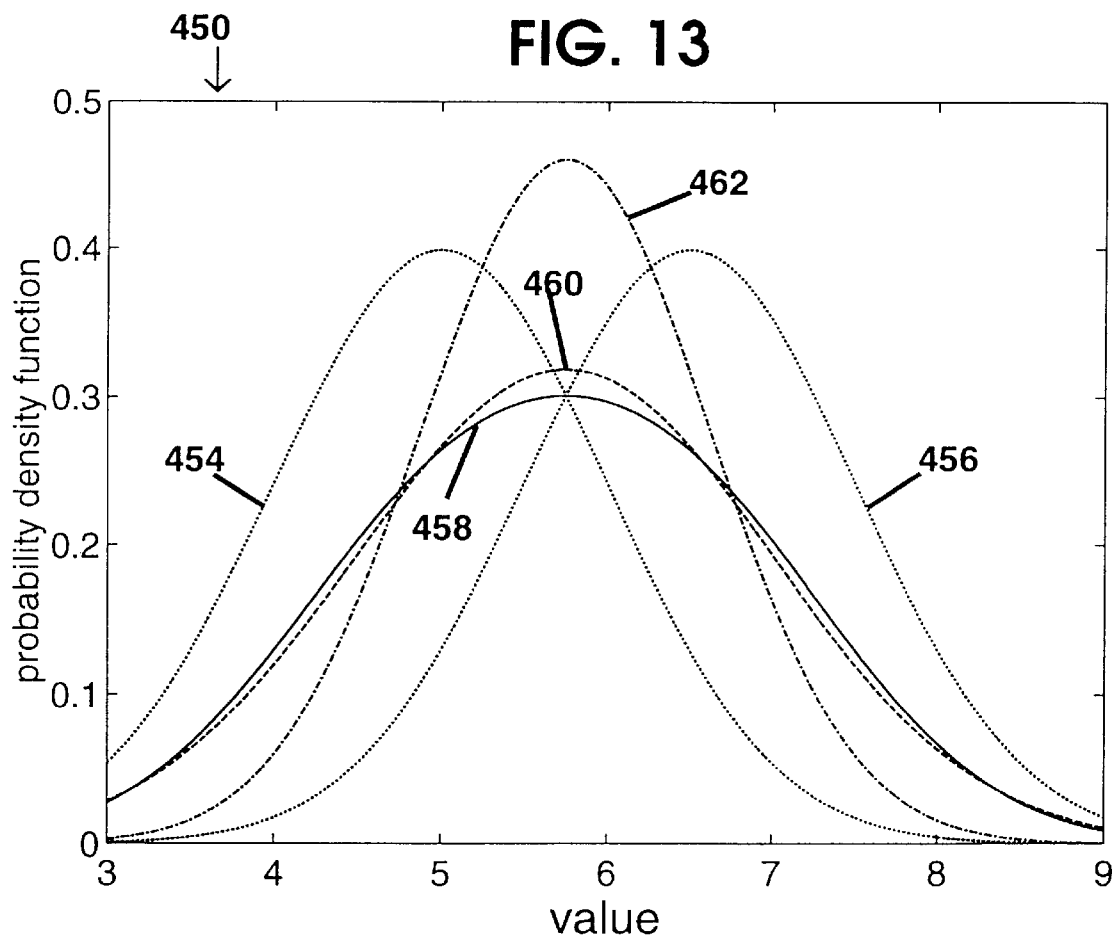
FIG. 13 is a graph demonstrating the effectiveness of random field union in estimating the first and second spatial moments of merged heterogeneous random fields.

With reference now to FIG. 13, graph 450 shows the effectiveness of random field union for merging first and second moments of statistically heterogeneous Gaussian random variables. Curve 454 represents the true probability density function of a normally distributed random variable A, and curve 456 represents the true probability density function of a normally distributed random variable B. Random variables are statistically spatially heterogenous if any of their true spatial moments differ. In this example, the true mean of A is 5.0 and the true mean of B is 6.5, so A and B are statistically heterogeneous. In this example, both A and B have a variance of 1.0, and the covariance between A and B is 0.5. When these two random variables are merged (i.e., a new random variable is created that represents the spatial region covered by the sum of the spatial regions represented by A and B), the true probability density function of the merged random variable C (which is slightly non-normal) is shown by curve 458. The probability density function of C, as estimated by a normal distribution with first and second moments as calculated by random field union, is shown by curve 460, and has an estimated variance of 1.56. The probability density function of C, as estimated by a normal distribution with the first and second moments as calculated by the classical method of random field averaging, is shown by curve 462, and has an estimated variance of 0.75. From graph 450, it is apparent that the estimated variance by random field union (curve 460) more closely approximates the true variance of the merged random variable, in comparison to the grossly underestimated variance by random field averaging (curve 462). Random field averaging was derived based on an assumption of statistical homogeneity, whereas random field union is based on an assumption of possible statistical heterogeneity. In the case of merging statistically homogeneous random variables, both methods give the same result. Hence, random field union is more general than random field averaging.

Figure 14:
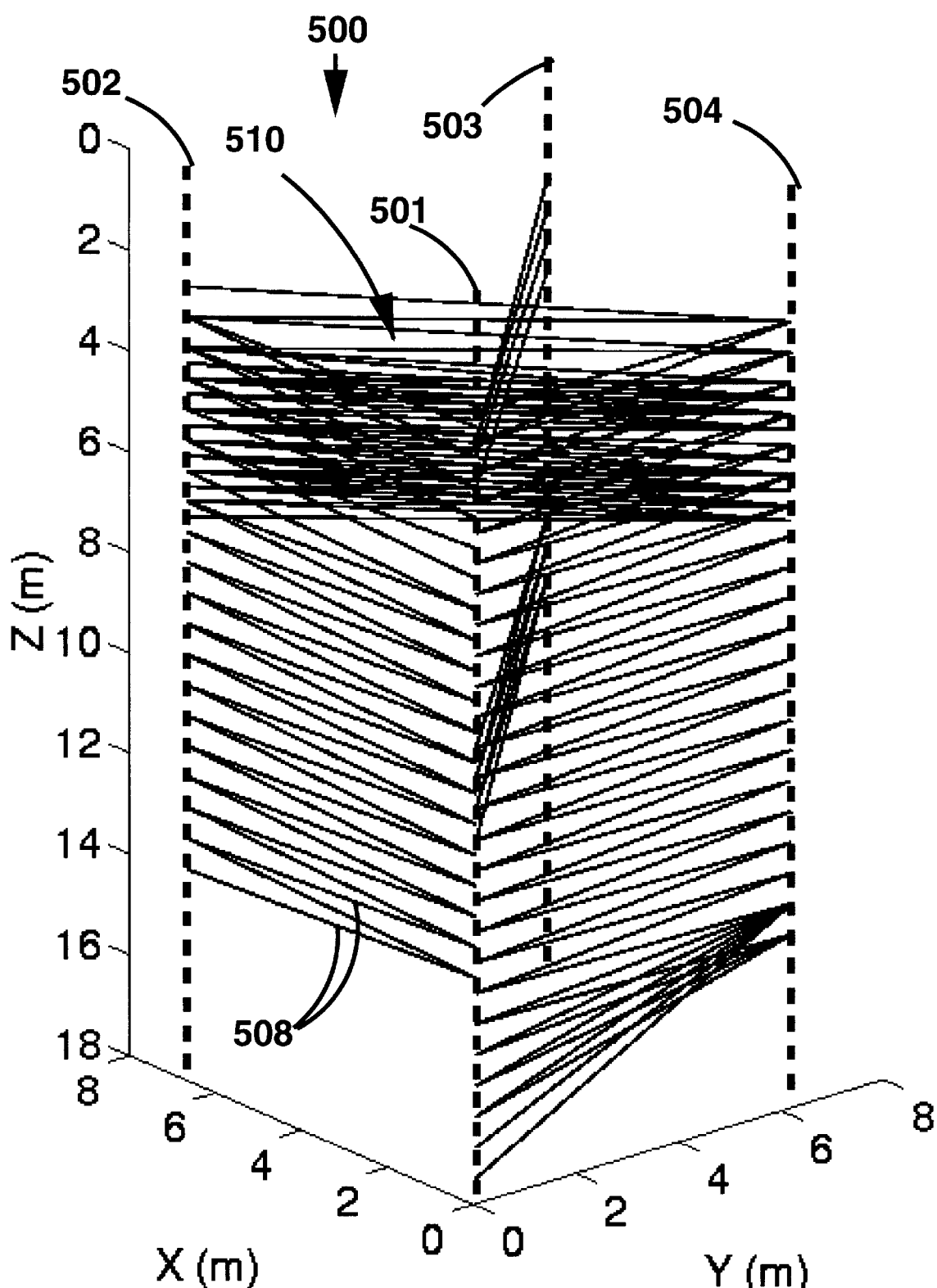
FIG. 14 is a specific set of tomographic signals from crosswell ground-penetrating radar transmissions used in an example application of the invention.
Figure 16A:
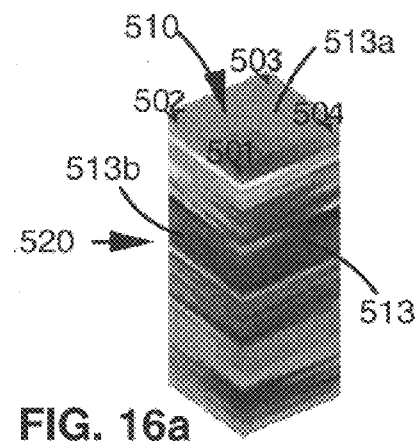
FIG. 16 is a graphical representation of three bounding faces of six three-dimensional ground-penetrating radar propagation velocity estimates (in FIGS. 16a–16f) produced using six different cluster tolerance criteria in the upscaling process of the invention.
Figure 16B:
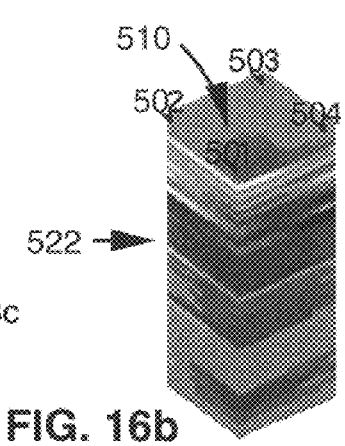
Figure 16C:
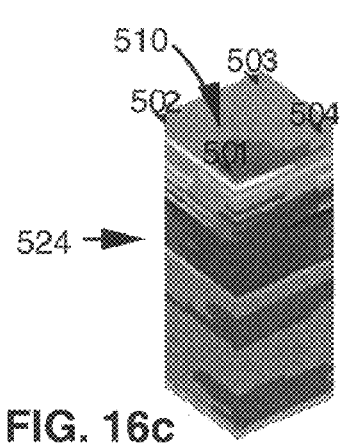
Figure 16D:
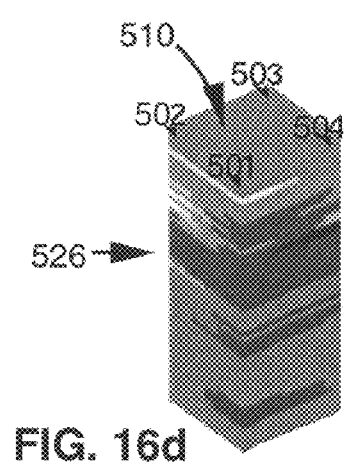
Figure 16E:
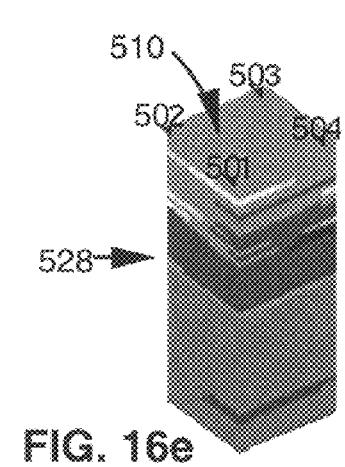
Figure 16F:
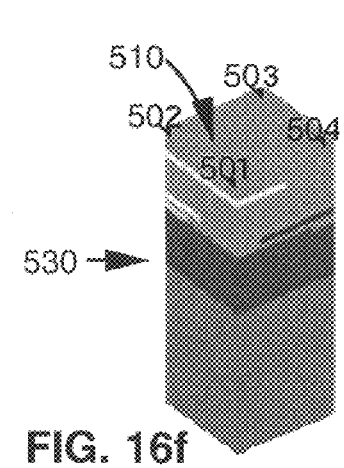

With reference now to FIG. 14, measurement system 500 depicts the system for obtaining a set of measurements for the example application. Here, wells 501, 502, 503, and 504 were pushed in the approximate corners of a domain 510 of dimension 7.01 m by 7.32 m by 16.5 m deep section of earth in the unsaturated zone. Ground-penetrating radar signals, depicted, for simplicity, as straight rays 508, were emitted at a frequency of 100 MHz from sources 12 (not shown) in wells 501, 501, 504, and 504. The signal rays traversed domain 510 and were detected by receivers 14 (not shown) in wells 502, 503, 501, and 502, respectively, and first arrival traveltime measurements were recorded. As is evident from the distribution of rays 508, the set of tomographic measurements obtained was sparse and nonuniform.

With reference now to FIG. 15, graphs 512a and 512b show the six bounding faces 513a–513f of the estimated velocities for domain 510, as determined by the method of the present invention as set forth in flowchart 230 of FIG. 9 and output as graphical representations where the color scale (in this case grey scale) graphically depicts velocity values. The measurements assembled in step 231 are from the signals 508 shown in system 500. Graph 512a is an exterior view of bounding faces 513a–513c and graph 512b is an interior view of bounding faces 513d–513f. Domain 510 was modeled with a right rectangular finite difference grid of 30360 regularly spaced (1 ft. spacing) nodes, with 23 by 24 nodes (for a total of 552 nodes) in each horizontal plane of the grid, with 55 depth planes. Log slowness was initially estimated for each plane (in steps 232 and 238) on a coarser grid, using the method put forth in flowchart 90 of FIG. 4, as follows. During previous field surveys, initial 2-D measurements ground-penetrating radar travel times (step 92) had been obtained and used to estimate a mean log slowness of 2.42 with a variance of 0.03. Random variables representing propagation slowness were created for each of the 552 nodes on a horizontal plane (step 94), all with initial mean values of 2.42, variance of 0.03, and assuming negative exponential horizontal correlation with a horizontal correlation length of 3.048 m and no vertical correlation. Each such plane p was initially upscaled (step 96) by partitioning the set of 552 random variables into 132 subsets (step 98), such that each subset contained four mutually horizontally adjacent parameter random variables (or two horizontally adjacent parameter random variables near some edges of the domain model where four were not possible). These were merged (step 100) using random field union into 132 random variables. The set of 132 merged random variables representing one depth plane was output in step 102, and was used within steps 232 and 238 in flowchart 230 of FIG. 9 in building up the growing domain model. Each of the 55 depth planes were thus modeled by a total of 7260 initial parameter random variables, although these 7260 random variables were never represented in the computer simultaneously. Using a velocity-based cluster tolerance criterion of 0.003 m/ns in steps 274 and 298, the method yielded the velocity estimate (transformed from estimated log slowness) shown in graph 512a in 398 random variables. This estimate reduced the root mean square traveltime estimation error of all signals 508 by 47%, relative to that of the homogeneous initial estimate. The deduced lithologic structure of domain 510 was in good agreement with independent cone penetrometer data at corner wells 501–504 and at center well 515, as demonstrated by the inventors in their publication "Efficient 3-D data inversion: Soil characterization and moisture monitoring from crosswell GPR at a Vermont test site," *Water Resources Research,* 34(8) :1889–1900, 1998.

With reference now to FIGS. 16a–16f, graphs 520, 522, 524, 526. 528, and 530, respectively, show three exterior bounding faces 513a–513c of domain 510 using cluster tolerance criteria of 0.006, 0.009, 0.012, 0.018,0.021, and 0.034, respectively. The locations of wells 501–504 are indicated for reference. The number of random variables in these estimates is 126, 64, 35, 22, 16, and 7, respectively. The resulting velocity estimates shown in graphs 512a, 512b, 520, 522, 524, 526, 528, and 530 all have the same overall mean (averaged over all 30360 nodes) of 0.72 m/ns. A visual comparison of these estimates shows that the main structural features of domain 510 are estimated consistently, despite the varying degrees of resolution. This demonstrates how the method can be used to select the desired degree of heterogeneity which is appropriate for a given application.

The general nature of the methods disclosed herein permit inversion of tomographic measurements from a wide variety of signal types, including nuclear emissions (e.g., x-rays, neutrons, positrons), electromagnetic waves (e.g., radar, optical), acoustic waves (e.g., seismic, sonic, ultrasonic), mechanical waves (e.g., shear, pressure), nuclear magnetic resonance, electrical data (e.g., voltage, current), hydrologic data (e.g., piezometric head, solute concentration, solute or particle transport), or the like. Thus, it is to be appreciated the methods of the present invention may be advantageously employed across a wide range of signal types propagating within a wide range of domains.

While the present invention has been described in connection with preferred embodiments, it will be understood that it is not limited to those embodiments. On the contrary, it is intended to cover all alternatives, modifications, and equivalents as may be included within the spirit and scope of the invention as defined in the appended claims.

We claim:

1. A method of estimating a physical domain's internal structure, the method comprising the steps of:
   a) assembling a set of measurements Z including tomographic measurements of signals traversing a portion of the physical domain and emitted from sources and detected at receivers proximate the domain;
   b) assembling, in a computer, a set of random variables representing at least one parameter describing the domain's internal structure, including prior estimates of first and second spatial moments of said random variables; and
   c) performing measurement conditioning of said set of random variables, on one or more subsets of said measurements Z.

2. A method according to claim 1, wherein said step a) is performed so that said set of measurements includes at least one measurement of said at least one parameter describing the domain's internal structure.

3. The method according to claim 1, wherein said step b) is performed so that said set of random variables further includes random variables representing at least one dynamic state of the domain.

4. A method according to claim 1, further comprising the step, before said step a), of generating signals with sources proximate the physical domain so that said signals travel through the domain and are modified by the internal structure of the domain, receiving said signals with receivers proximate the physical domain, measuring aspects of said received signals, and using said measurements in said step a).

5. A method of estimating a physical domain's internal structure, the method comprising the steps of:
   a) assembling a set of measurements Z including tomographic measurements of signals traversing a portion of the physical domain and emitted from sources and detected at receivers proximate the domain;
   b) assembling, in a computer, a set D of random variables representing at least one parameter describing the domain's internal structure, including prior estimates of first and second spatial moments of said random variables;
   c) performing measurement conditioning of said set D, on one or more subsets of said measurements Z; and
   d) upscaling said set D, comprising the steps of
      i) estimating a partition of subsets $S_i$ (i=1,K) of said set D; and
      ii) merging said random variables contained within each of said K subsets $S_i$ thereby replacing said random variables in said set D with said K merged random variables.

6. A method according to claim 5, further including, after said step d), the step:
   e) iterating steps c) and d) zero or more times, wherein said conditional estimates of said merged random variables generated in one iteration are used as said prior estimates in the next iteration.

7. The method according to claim 5 wherein said step b) is performed so that said set of random variables further includes random variables representing at least one dynamic state of the domain.

8. The method according to claim 5, wherein said step c) is accomplished using approximate extended Kalman filtering.

9. The method according to claim 5, wherein said step d)i) is accomplished using a cluster analysis method.

10. The method according to claim 5, wherein said step d)ii) is accomplished using random field union.

11. A method according to claim 5, further comprising the step, before said step a), of generating signals with sources proximate the physical domain so that said signals travel through the domain and are modified by the internal structure of the domain, receiving said signals with receivers proximate the physical domain, measuring aspects of said received signals, and using said measurements in said step a).

12. A method of estimating a physical domain's internal structure, the method comprising the steps of:
   a) assembling a set of direct measurements of at least one parameter within the domain describing the domain's internal structure;
   b) assembling, in a computer, a set D of random variables representing said at least one parameter describing the domain's internal structure, including estimates of first and second spatial moments of said random variables based on said measurements; and
   c) upscaling said set D, comprising the steps of:
      i) estimating a partition of K subsets $S_i$ (i=1,K) of said set D; and
      ii) merging said random variables contained within each of said K subsets $S_i$ thereby replacing said random variables in said set D with said K merged random variables.

13. The method according to claim 12, wherein said step c)ii) is performed using random field union.

14. A method according to claim 12, further comprising the step, before said step a), of directly measuring at least one or more parameters describing the domain's internal structure, and using said measurements in said step a).

15. A method of estimating a physical domain's internal structure, the method comprising the steps of:
   a) assembling a set of measurements Z including tomographic measurements of signals traversing a portion of the physical domain and emitted from sources and detected at receivers proximate the domain;
   b) assembling, in a computer, a set D of random variables representing at least one parameter describing the domain's internal structure, including prior estimates of first and second spatial moments of said random variables;
   c) partitioning said set D into subsets $D_i$ (i=1,N); and
   d) performing measurement conditioning (using one or more subsets of said measurements 7) and upscaling of each of said subsets $D_i$ (i=1, N), thereby replacing said set D with the union of said conditioned and upscaled subsets $D_i$ (i=1, N).

16. A method according to claims 15, further including, after said step d), the step:
   a) upscaling said set D.

17. A method according to claim 15, further, including, after said step d), the step:
   a) performing measurement conditioning using one or more subsets of said measurements Z of said set D.

18. A method according to claim 16, further including, after said step e) the step:
   a) performing measurement conditioning using one or more subsets of said measurements Z of said set D.

19. A method according to claim 15, further comprising the step, before said step a), of generating signals with sources proximate the physical domain so that said signals travel through the domain and are modified by the internal structure of the domain, receiving said signals with receivers proximate the physical domain, measuring aspects of said received signals, and using said measurements in said step a).

20. A method of estimating a physical domain's internal structure, the method comprising the steps of:
   a) assembling a set of measurements Z including tomographic measurements of signals traversing a portion of the physical domain and emitted from sources and detected at receivers proximate the domain;
   b) assembling, in a computer, a set D of random variables representing at least one parameter describing the domain's interior, including prior estimates of first and second spatial moments of said random variables;
   c) initializing a set of random variables U to be equal to said set D, and a set of random variables E to be the empty set;
   d) removing a subset of random variables R from said set U, and adding said subset R into said set E,
   e) performing measurement conditioning (on one or more subsets of said measurements Z) and upscaling of said set E; and
   (f) repeating said steps d) and e) until said set U is the empty set.

21. The method according to claim 15 wherein, in said step d), for each of said subsets $D_i$ (i=1, N), conditioning and upscaling comprise the steps of:
   i) initializing a set of random variables $U_i$ to be equal to said set $D_i$, and a set of random variables $E_i$ to be the empty set;
   ii) removing a subset of random variables R from said set $U_i$ and adding said subset R into said set $E_i$;
   iii) performing measurement conditioning on one or more subsets of said measurements Z and upscaling of said set $E_i$; and
   iv) repeating said steps ii) and iii) until said set $U_i$ is the empty set.

22. A method according to claim 20, further comprising the step, before said step a), of generating signals with sources proximate the physical domain so that said signals travel through the domain and are modified by the internal structure of the domain, receiving said signals with receivers proximate the physical domain, measuring aspects of said received signals, and using said measurements in said step a).

23. The method according to claim 15, wherein said conditioning is performed using approximate extended Kalman filtering.

24. The method according to claim 20, wherein said conditioning is performed using approximate extended Kalman filtering.

25. The method according to claim 15, wherein said upscaling is performed using cluster analysis followed by random field union.

26. The method according to claim 20, wherein said upscaling is performed using cluster analysis followed by random field union.

27. A method according to claim 1, further including the step of outputting at least one of said estimates as a graphical representation.

28. A method according to claim 5, further including the step of outputting at least one of said estimates as a graphical representation.

29. A method according to claim 12, further including the step of outputting at least one of said estimates as a graphical representation.

30. A method according to claim 15, further including the step of outputting at least one of said estimates as a graphical representation.

31. A method according to claim 20, further including the step of outputting at least one of said estimates as a graphical representation.

32. A computer-readable medium containing instructions that cause a computer to perform the method of claim 1.

33. A computer-readable medium containing instructions that cause a computer to perform the method of claim 5.

34. A computer-readable medium containing instructions that cause a computer to perform the method of claim 12.

35. A computer-readable medium containing instructions that cause a computer to perform the method of claim 15.

36. A computer-readable medium containing instructions that cause a computer to perform the method of claim 20.

37. A computer-readable medium containing instructions that cause a computer to perform approximate extended Kalman filtering.

38. A computer-readable medium containing instructions that cause a computer to perform random field union.

39. A tomography system for estimating a physical domain's internal structure, comprising:
   a) a plurality of sources proximate the domain for sending signals through the domain;
   b) a plurality of receivers proximate the domain for receiving said signals; and
   c) a computer programmed to perform the method set forth in claim 1.

40. A tomography system for estimating a physical domain's internal structure, comprising:
   a) a plurality of sources proximate the domain for sending signals through the domain;
   b) a plurality of receivers proximate the domain for receiving said signals; and
   c) a computer programmed to perform the method set forth in claim 5.

41. A tomography system for estimating a physical domain's internal structure, comprising:
   a) a plurality of sources proximate the domain for sending signals through the domain;
   b) a plurality of receivers proximate the domain for receiving said signals; and
   c) a computer programmed to perform the method set forth in claim 15.

42. A tomography system for estimating a physical domain's internal structure, comprising:
   a) a plurality of sources proximate the domain for sending signals through the domain;
   b) a plurality of receivers proximate the domain for receiving said signals; and
   c) a computer programmed to perform the method set forth in claim 20.

43. A tomographic system for estimating a physical domain's internal structure, the method comprising the steps of:
   a) means for assembling a set of measurements Z including tomographic measurements of signals traversing a portion of the physical domain and emitted from sources and detected at receivers proximate the domain;
   b) means for assembling, in a computer, a set of random variables representing at least one parameter describing the domain's internal structure, including prior estimates of first and second spatial moments of said random variables; and
   c) means for performing approximate extended Kalman filtering of said estimates on one or more subsets of said measurements Z.

44. A tomographic system for estimating a physical domain's internal structure, the method comprising the steps of:
   a) means for assembling a set of measurements Z including tomographic measurements of signals traversing a portion of the physical domain and emitted from sources and detected at receivers proximate the domain;
   b) means for assembling, in a computer, a set D of-parameter random variables representing at least one parameter describing the domain's internal structure, including prior estimates of first and second spatial moments of said random variables;
   c) means for conditioning said estimates on one or more subsets of said measurements Z; and
   d) means for upscaling said set D, said upscaling means including:
      i) partitioning means for estimating a partition of subsets $S_i$ (i=1,K) of said set D; and
      ii) merging means for merging said random variables contained within each of said K subsets $S_i$ and replacing said random variables in said set D with said K merged random variables.

45. A tomographic system for estimating a physical domain's internal structure, the method comprising the steps of:
   a) means for assembling a set of measurements Z including tomographic measurements of signals traversing a portion of the physical domain and emitted from sources and detected at receivers proximate the domain;
   b) means for assembling, in a computer, a set D of random variables representing at least one parameter describing the domain's internal structure, including prior estimates of first and second spatial moments of said random variables;
   c) means for partitioning said set D into subsets $D_i$ (i=1,N); and
   d) means for performing measurement conditioning (using one or more subsets of said measurements Z) and upscaling of each of said subsets $D_i$ (i=1,N), thereby replacing said set D with the union of said conditional and upscaled subsets $D_i$ (i=1,N).

46. A tomographic system for estimating a physical domain's internal structure, the method comprising the steps of:
   a) means for assembling a set of measurements Z including tomographic measurements of signals traversing a portion of the physical domain and emitted from sources and detected at receivers proximate the domain;
   b) means for assembling, in a computer, a set D of random variables representing at least one parameter describing the domain's interior, including prior estimates of first and second spatial moments of said random variables;
   c) means for initializing a set U of random variables to be equal to said set D, and a set E of random variables to the empty set;
   d) means for removing a subset R of random variables from said set U and adding said subset R into said set E;

e) means for preforming measurement conditioning (on one or more subsets of said measurements Z) and upscaling of said set E; and f) means for repeating steps d) and e) until said set U is the empty set.

47. A method according to claim 1, wherein the physical domain includes a section of earth.

48. A method according to claim 5, wherein the physical domain includes a section of earth.

49. A method according to claim 12, wherein the physical domain includes a section of earth.

50. A method according to claim 15, wherein the physical domain includes a section of earth.

51. A method according to claim 20, wherein the physical domain includes a section of earth.

52. A method according to claim 1, wherein the physical domain includes a section of biological tissues.

53. A method according to claim 5, wherein the physical domain includes a section of biological tissues.

54. A method according to claim 15, wherein the physical domain includes a section of biological tissues.

55. A method according to claim 20, wherein the physical domain includes a section of biological tissues.

56. A method according to claim 1, wherein the physical domain includes a section of a man-made material body.

57. A method according to claim 5, wherein the physical domain includes a section of a man-made material body.

58. A method according to claim 12, wherein the physical domain includes a section of a man-made material body.

59. A method according to claim 15, wherein the physical domain includes a section of a man-made material body.

60. A method according to claim 20, wherein the physical domain includes a section of a man-made material body.

* * * * *